US012750634B2

(12) United States Patent
Welti et al.

(10) Patent No.: US 12,750,634 B2
(45) Date of Patent: Sep. 29, 2026

(54) TECHNIQUES FOR OUTPUTTING AUDIO THROUGH A PLURALITY OF DRIVERS WITHIN A SAME AUDIO OUTPUT DEVICE

(71) Applicant: HARMAN INTERNATIONAL INDUSTRIES, INCORPORATED, Stamford, CT (US)

(72) Inventors: Todd S. Welti, Thousand Oaks, CA (US); Jason Riggs, Northridge, CA (US); Joy Lyons, Lake Forest Park, WA (US)

(73) Assignee: Harman International Industries, Incorporated, Stamford, CT (US)

( * ) Notice: Subject to any disclaimer, the term of this patent is extended or adjusted under 35 U.S.C. 154(b) by 613 days.

(21) Appl. No.: 18/314,439

(22) Filed: May 9, 2023

(65) Prior Publication Data

US 2023/0370805 A1 Nov. 16, 2023

Related U.S. Application Data

(60) Provisional application No. 63/340,593, filed on May 11, 2022.

(51) Int. Cl.
*H04S 7/00* (2006.01)
*H04R 5/033* (2006.01)
*H04S 3/00* (2006.01)

(52) U.S. Cl.
CPC ............ *H04S 7/305* (2013.01); *H04R 5/033* (2013.01); *H04S 3/002* (2013.01)

(58) Field of Classification Search
CPC .............. H04R 3/14; H04R 1/26; H04R 3/12
See application file for complete search history.

(56) References Cited

FOREIGN PATENT DOCUMENTS

| | | |
|---|---|---|
| WO | 2008/019231 A2 | 2/2008 |
| WO | 2021/094549 A1 | 5/2021 |

*Primary Examiner* — Kile O Blair
(74) *Attorney, Agent, or Firm* — Artegis Law Group, LLP

(57) ABSTRACT

In various embodiments, a method includes receiving a first audio channel signal; causing a first driver and a second driver of an audio output device to output a first frequency range of the first audio channel signal with a first power output; causing the first driver to output a second frequency range of the first audio channel signal with a second power output; and causing the second driver to output the second frequency range of the first audio channel signal with a third power output that is higher than the second power output, wherein the second frequency range is higher than the first frequency range.

20 Claims, 17 Drawing Sheets

TECHNIQUES FOR OUTPUTTING AUDIO THROUGH A PLURALITY OF DRIVERS WITHIN A SAME AUDIO OUTPUT DEVICE

CROSS-REFERENCE TO RELATED APPLICATIONS

This application claims the priority of the United States Provisional patent application titled, "TECHNIQUES FOR OUTPUTTING AUDIO THROUGH A PLURALITY OF DRIVERS WITHIN A SAME AUDIO OUTPUT DEVICE," filed on May 11, 2022, and having Ser. No. 63/340,593. The subject matter of this related application is hereby incorporated herein by reference.

BACKGROUND

Field of the Various Embodiments

The various embodiments relate generally to audio output devices and, more specifically, to techniques for outputting a single channel of audio through a plurality of drivers within a same audio output device, operating in the same frequency range.

DESCRIPTION OF THE RELATED ART

Media systems, such as a television, music system, computer, game console, or mobile device, often transmit audio output signals to one or more devices, such as wired or wireless audio output devices (also referred to as loudspeaker systems). In some audio output devices (e.g., a portable music player, a speaker unit, or the like), a housing includes a plurality of drivers, such as first and second loudspeaker transducers. The plurality of drivers can be of a same or similar kind, such as a plurality of full-range drivers, each of which outputs audio in the same or similar frequency range. Such audio output devices can output multi-track audio in which the received audio signal includes a plurality of audio channels. For example, such audio output devices can output stereo audio, such as outputting a first channel of the stereo audio through a first driver and a second channel of the stereo audio through a second driver of the audio output device. The spatial separation of the audio into multiple outputs by the first and second drivers improves the quality of the audio as compared with mono audio output.

A first audio output device can be coupled to a second audio output device that also includes a plurality of drivers in a conventional mono configuration. The second audio output device can be of a same or similar kind as the first audio output device; for example, the plurality of drivers of the audio output devices can be the same or similar. In other cases, the audio output devices can be of different kinds; for example, the first audio output device can include a plurality of drivers, and the second output device can include one driver. In this mono configuration, each of the audio output devices can output one channel of the multi-track audio signal through the plurality of drivers of the audio output device. For example, the first audio output device can output a first channel of stereo audio through two or more drivers of the first device, and a second audio output device can output a second channel of stereo audio. Therefore, in a conventional mono configuration, an audio output device receives an audio signal for a single channel and the plurality of drivers of the audio output device each output the same or similar audio sound for the same audio signal. In this mono configuration, because the power of each audio output device is used only for one of the channels, the total power output of the audio sound increases. Also, the distance between the plurality of drivers within the housing of the first audio output device and the plurality of drivers within the housing of the second audio output device is larger than the distance between the drivers within the respective housing of either of the audio output devices. The increased distance separation of the audio output devices and their drivers can further improve the quality of the audio sound and/or allow audio sound to be heard over a larger area.

One drawback that can occur with a conventional mono configuration is the interference caused by the outputted audio sound of a same audio signal by a plurality of drivers, operating over the same frequency range, of a same audio output device. When each of the two or more drivers of a same audio output device output the same or similar audio sound, the combined audio output of the drivers can create a spatial interference pattern. As a result, the human perceived volume level of the audio sound output of the drivers can change at different locations around the audio output device. For example, the volume of the audio sound heard from the drivers can vary significantly between the left and right ears of a listener. Also, the perceived volume level can significantly change as the listener moves his or her head over small distances. Further, the air pressure caused by the audio sound output can vary between the left and right ears of the listener. These interference effects caused by outputting one channel of audio through each of the plurality of drivers in the same audio output device can distort the audio sound output and can be physically unpleasant for the listener.

As the foregoing illustrates, what is needed are more effective techniques for outputting audio sound through a plurality of drivers within a same audio output device.

SUMMARY

In various embodiments, a method includes receiving a first audio channel signal; causing a first driver and a second driver of an audio output device to output a first frequency range of the first audio channel signal with a first power output; causing the first driver to output a second frequency range of the first audio channel signal with a second power output; and causing the second driver to output the second frequency range of the first audio channel signal with a third power output that is higher than the second power output, wherein the second frequency range is higher than the first frequency range.

Further embodiments provide, among other things, a system, a device, and/or a non-transitory computer-readable medium that are similar to the method set forth above.

At least one technical advantage of the disclosed techniques relative to the prior art is that, with the disclosed techniques, the interference caused by the combined audio sound output of a plurality of drivers of a same audio output device outputting a same audio channel is significantly reduced. As a result, the quality of the audio sound output is improved when using a plurality of drivers of a same audio output device to output an audio signal for a single audio channel. Reducing an audio sound output of the second frequency range (e.g., a high frequency range) of the single audio channel can reduce the perceived variance in volume and/or air pressure between a listener's left ear or right ear and/or the perceived change in volume as the listener moves his or her head. This additionally produces a frequency response that is more consistent across the frequency spectrum and across the spatial field, as well as being more consistent with the source audio channel signal. Also, outputting the first frequency range (e.g., a low frequency range) of the single audio channel through each of the plurality of drivers can increase the power efficiency of the audio sound output as compared with completely disabling one or more drivers for the full frequency range of the single audio channel. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts can be practiced without one or more of these specific details. As used herein, the term "same or similar" in relation to values, such as gain, power output, or frequency range, refers to values that are the same or substantially the same with any variance in the values being nominal.

Mono Configuration System

Figure 1:
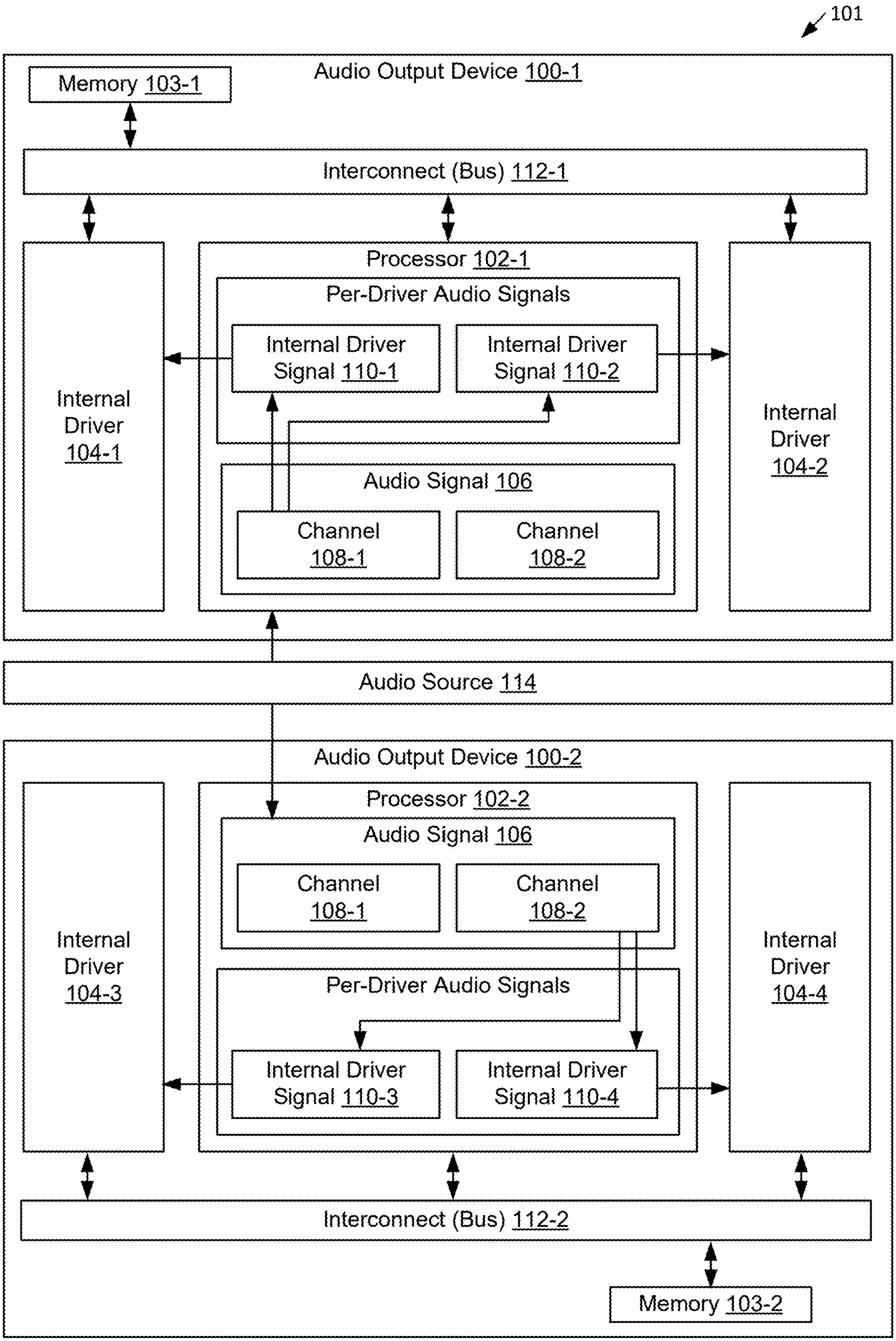
FIG. 1 illustrates a mono configuration system configured to implement one or more aspects of the various embodiments.

FIG. 1 illustrates a mono configuration system 101 configured to implement one or more aspects of the various embodiments. As shown, the mono configuration system 101 includes a first audio output device 100-1 and a second audio output devices 100-2 coupled to one another and to an audio source device 114. Each audio output device 100-1, 100-2 includes, without limitation, a processor 102, a memory 103, and a plurality of drivers 104 that are interconnected via an interconnect bus 112. Examples of an audio output device 100 include, without limitation, a portable audio player, a self-powered portable speaker unit, powered wireless loudspeaker system, smart powered loudspeaker system, or any other type of loudspeaker system that houses a plurality of drivers (loudspeaker transducers).

In some embodiments, the processor 102-1, 102-2 of each audio output device 100-1, 100-2 includes one or more audio filters (e.g., one or more low-pass filters, band-pass filters, high-pass filters, all-pass filters, shelf filter, high-shelf filter, low-shelf filter, or the like, or any combination thereof) that process a received audio signal 106 in accordance with mono-signal processing techniques described in embodiments herein. In some embodiments, each processor 102-1, 102-2 includes one or more central processing units (CPU), graphics processing units (GPU), application-specific integrated circuits (ASIC), field programmable gate arrays (FPGA), digital signal processors (DSP), and/or any other type of processing unit. In some embodiments, each processor 102-1, 102-2 includes a combination of different processing units, such as a CPU configured to operate in conjunction with a GPU. In some embodiments, each processor 102-1, 102-2 of each audio output device 100-1, 100-2 is configured to execute instructions stored in a memory 103-1, 103-2 of the audio output device 100-1, 100-2. In general, the processor 102-1, 102-2 of each audio output device 100-1, 100-2 can be any technically feasible hardware unit capable of processing data and/or executing software applications and/or processing audio. In these embodiments, each processor 102-1, 102-2 performs signal processing on a received audio signal 106 in accordance with mono-signal processing techniques described in embodiments herein.

In some embodiments, each audio output device 100-1, 100-2 includes two or more internal drivers 104. Each internal driver 104 comprises a loudspeaker transducer that generates audio sound output at one or more frequency ranges. Each driver 104 can also include an amplifier (not shown) that can increase and/or decrease a power output of the driver 104 based on a received driver signal 110. As shown, the plurality of drivers 104 of the first audio output device 100-1 includes a first driver 104-1 and a second driver 104-2. As shown, the plurality of drivers 104 of the second audio output device 100-2 includes a first driver 104-3 and a second driver 104-4. The drivers 104-1, 104-2, 104-3, 104-4 can be a same or similar type as one another, or can be of different types. In some embodiments, in each audio output device 100-1, 100-2, a first driver 104-1, 104-3 outputs audio sound with a same or similar frequency response as a second driver 104-2, 104-4. In these embodiments, each driver 104 can comprise a full-range driver that outputs a full frequency range of the audio signal 106. In other embodiments, in each audio output device 100-1, 100-2, a first driver 104-1, 104-3 (e.g., a tweeter) outputs a high frequency range of the audio signal 106, and a second driver 104-2, 104-4 (e.g., a woofer) outputs a low frequency range of the audio signal 106. In further embodiments, each driver 104-1, 104-3 comprises a driver system comprising a crossover and multiple drivers, such as a tweeter and woofer, that each output different frequency ranges.

The processor 102-1, 102-2 of each audio output device 100-1, 100-2 receives an audio signal 106 to be output by the plurality of drivers 104 of the audio output device 100-1, 1002. As shown, the audio signal 106 is received from an audio source device 114, such as a television, a music system, a computer, a game console, or a portable device. The audio source device 114 can transmit the audio signal 106 to each audio output device 100-1, 100-2 via a wired or wireless connection. For example, the audio source 114 can transmit the audio signal 106 to each audio output device 100-1, 100-2 by a radio signal that each audio output device 100-1, 100-2 receives by a wireless communication interface (such as an antenna) or an external audio receiver that receives and then transmits the audio signal 106 to the audio output device 100-1, 100-2. In some embodiments (not shown), the audio source 118 can be included in one or both of the audio output devices 100-1, 100-2, and can generate the audio signal 106 and/or retrieve the audio signal 106 from a memory 103-1, 103-2 and/or storage of the audio output device 100-1, 100-2.

The memory 103-1, 103-2 of each audio output device 100-1, 100-2 can include a random-access memory (RAM) module, a flash memory unit, or any other type of memory unit or combination thereof. Memory 103-1, 103-2 includes various software programs (e.g., an operating system, one or more applications) that can be executed by the processor 102-1, 102-2 of the audio output device 100-1, 100-2 and application data associated with the software programs. The memory 103-1, 103-2 also includes instructions for mono-signal processing techniques that is executed by the processor 102 to process a received audio signal 106 in accordance with the mono-signal processing techniques described in embodiments herein. Storage (not shown) of each audio output device 100-1, 100-2 can include non-volatile storage for applications and data and can include fixed or removable disk drives, flash memory devices, and CD-ROM, DVD-ROM, Blu-Ray, HD-DVD, or other magnetic, optical, or solid-state storage devices.

The interconnect bus 112-1, 112-2 of each audio output device 100-1, 100-2 connects the processor 102-1, 102-2, the memory 103-1, 103-2, the storage, and any other components of the audio output device 100-1, 100-2. In some embodiments, in each audio output device 100-1, 100-2, the interconnect bus 112-1, 112-2 couples the processor 102-1, 102-2 to the first driver 104-1, 104-3 and/or the second driver 104-2, 104-4 as well as other components, such as memory 103-1, 103-2 and/or storage. In some embodiments, in each audio output device 100-1, 100-2, the interconnect bus 112-1, 112-2 couples the processor 102-1, 102-2 to the first driver 104-1, 104-3 and/or the second driver 104-2, 104-4, and a different interconnect (e.g., another interconnect bus) couples the processor 102-1, 102-2 to other components of the audio output device 100-1, 100-2, such as memory 103-1, 103-2 and/or storage.

The audio source 114 generates and transmits an audio signal 106 to each audio output device 100-1, 100-2. The audio signal 106 can include multiple channels 108 (such as L/R stereo channels, 5.1 channels, 7.1 channels, and the like) comprising two or more separate and distinct audio channels, each audio channel comprising separate and distinct audio information of an audio source media (such as music, film, television, and the like). In some embodiments, audio signal 106 comprises a stereo audio signal 106 that includes a first audio channel signal 108-1 (e.g., left channel signal) and a second audio channel signal 108-2 (e.g., right channel signal). Based on the received audio signal 106, in each audio output device 100-1, 100-2, the processor 102-1, 102-2 generates a first driver signal 110-1, 110-3 for transmitting to the first driver 104-1, 104-3 and a second driver signal 110-2, 110-4 for transmitting to the second driver 104-2, 104-4.

In a stereo configuration (not shown), one or both of the audio output devices 100-1, 100-2 can output a stereo audio signal 106 comprising two (left/right) channels using the first driver 104-1, 104-3 and the second driver 104-2, 104-4. To output the stereo audio signal 106, the processor 102-1, 102-2 of each audio output device 100-1, 100-2 can generate a first driver signal 110-1, 110-3 that carries a first channel of the stereo audio signal 106 and a second driver signal 110-2, 110-4 that carries a second channel of the stereo audio signal 106. In one or both of the audio output devices 100-1, 100-2, the first driver 104-1, 104-3 and the second driver 104-2, 104-4 output different channels 108-1, 108-2 of the stereo audio signal 106 and, therefore, together output stereo audio sound.

In embodiments herein, rather than configuring each audio output device 100-1, 100-2 to output both channels 108-1, 108-2 of the audio signal 106, it can be desirable to cause each audio output device 100-1, 100-2 to output only one of the channels 108-1, 108-2 of the audio signal 106 in a mono configuration (as shown). For example, the first audio output device 100-1 can be positioned on a left side of an audio space (such as an indoor or outdoor space) to output only a single left channel of a stereo audio signal 106 of the audio source 118. The second audio output device 100-2 can be positioned on a right side of the audio space to output only a single right channel of the stereo audio signal 106 of the audio source 118. The greater physical distance between the audio output devices 100-1, 100-2 provides greater separation of the left and right channels 108-1, 108-2 of the stereo audio signal 106, which increases the quality of the stereo sound output and/or allows the stereo sound output to be heard over a larger area relative to the stereo configuration described above.

In a mono configuration (as shown), the audio output devices 100-1, 100-2 are coupled to the audio source 118. Each coupling can include a wire (e.g., a speaker wire or audio cable) and/or a wireless connection (e.g., a Bluetooth connection). In mono configuration, each audio output device 100-1, 100-2 receives and outputs only one of the audio channel signals 108-1, 108-2 of an audio signal 106 through both the first driver 104-1 and the second driver 104-2 of the audio output device 100-1, 100-2. In these embodiments, each audio output device 100-1, 100-2 outputs only one of the channels 108 of a multi-channel audio signal 106 and does not output any other channel of the multi-channel audio signal 106. In particular, the processor 102-1, 102-2 performs signal processing on a single audio channel 108-1, 108-2 (such as a left or right channel) to generate a first driver signal 110-1, 110-3 for transmitting to the first driver 104-1, 104-3 that carries at least a portion of the single audio channel 108-1, 108-2 of the audio signal 106 and generates a second driver signal 110-2, 110-4 for transmitting to the second driver 104-2, 104-4 that also carries at least a portion of the single audio channel 108-1, 108-2 of the audio signal 106. In these embodiments, the processor 102 receives an audio signal 106 that includes a single audio channel 108 and performs signal processing on the received audio signal 106 in accordance with the mono-signal processing techniques described herein to generate a first driver signal 110-1 to drive a first driver 104-1 and a second driver signal 110-2 to drive a second driver 104-2.

In alternative embodiments, the processor 102 resides in the audio source 114 rather than an audio output device 100 to perform the mono-signal processing techniques described herein. In these embodiments, the audio output device 100 comprises a legacy audio device that includes a first driver 104-1 and a second driver 104-2, but does not include processing components that are configured to or able to perform the mono-signal processing techniques described herein. In these embodiments, a memory (e.g., a memory similar to memory 103) and a processor (e.g., a processor similar to processor 102) (not shown) residing in the audio source 114 performs the mono-signal processing techniques to generate the first driver signal 110-1, which is transmitted to the legacy audio device to cause the first driver 104-1 in the legacy audio device to output audio sound based on the first driver signal 110-1. The processor residing in the audio source 114 further performs the mono-signal processing techniques to generate the second driver signal 110-2, which is transmitted to the legacy audio device to cause the second driver 104-2 in the legacy audio device to output audio sound based on the second driver signal 110-2.

Figure 2:
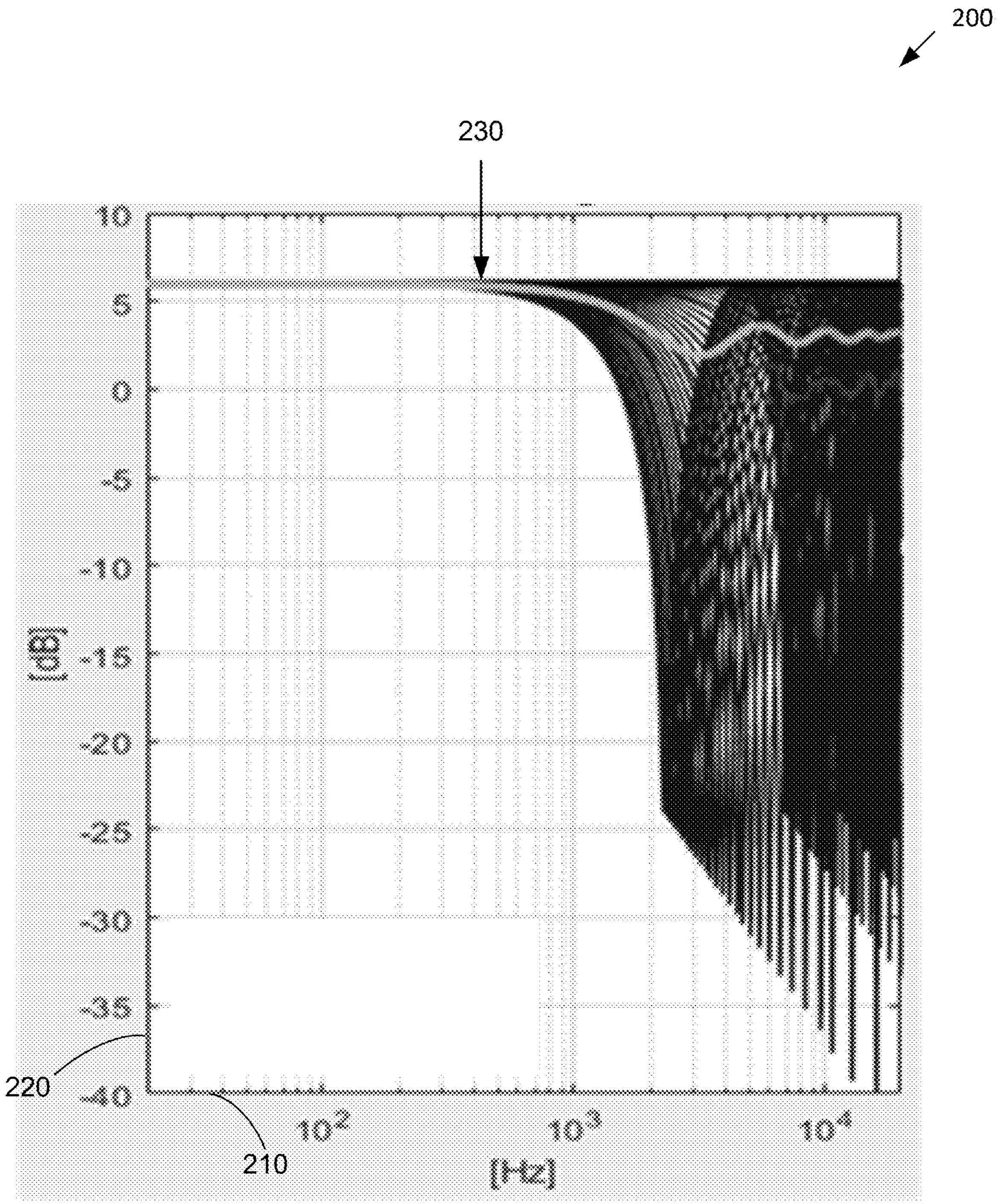
FIG. 2 is a frequency response graph that illustrates interference caused by implementing conventional signal processing techniques in the mono configuration system of FIG. 1, according to various embodiments.

FIG. 2 is a frequency response graph 200 that illustrates interference caused by implementing conventional signal processing techniques in the mono configuration system 101 of FIG. 1, according to various embodiments. Conventional signal processing techniques implemented in the mono configuration system 101 will typically generate the same or similar driver signals 110 for a plurality of drivers 104 of a same audio output device 100. As such, conventional signal processing techniques will cause the same audio output device 100 to output a same or similar audio sound with a same or similar power output across the same or similar frequency range through each of the plurality of drivers 104 of the same audio output device 100. When a plurality of drivers 110 are physical positioned relatively close together (having a relatively short distance separation) and output a same or similar audio sound with a same or similar power output across a same or similar frequency range, the combined audio sound output from the plurality of drivers 110 can create a spatial interference pattern. In general, spatial interference relates to constructive and destructive interference, a phenomenon that is also referred to as polar interference, comb filtering, or the combing effect.

The frequency response graph 200 comprises a frequency (Hz) axis 210 and a gain level (dB) axis 220 that illustrates this spatial interference pattern. The changes in gain level correspond to changes in combined effective acoustical output levels of the drivers and human perceived volume levels of the audio sound output. Destructive interference of the combined audio sound output of the plurality of drivers 104 can cause nulls or very low power output levels to appear at certain frequencies within the frequency range and at spatial locations corresponding to certain angles with respect to a forward axis of the drivers 110. Small changes in the frequency (Hz) and/or angle can result in large changes in power output, which a listener perceives as large changes in pressure and/or volume levels. The occurrence of such changes due to small changes in frequency and/or location can be irritating to the listener.

As shown, the amount of spatial interference is relatively small below a critical frequency Fc 230, and relatively large above the critical frequency Fc, where the amount of spatial interference becomes increasingly larger as frequency increases beyond the critical frequency Fc. In general, a lower frequency range of an audio channel 108 that is below the critical frequency Fc causes significantly less spatial interference than a higher frequency range of the audio channel 108 that is above the critical frequency Fc. In addition, increasingly higher frequencies in the higher frequency range generally cause increasingly greater spatial interference. The critical frequency Fc is determined by a physical distance d between the two separate drivers 104 that are outputting the same driver signal 110 across the same frequency range.

In embodiments herein, mono-signal processing techniques are implemented in the mono configuration system 101 that significantly reduces the spatial interference typically caused by conventional signal processing techniques. In some embodiments, the mono-signal processing techniques include a first processing technique described in relation to FIGS. 3-7, a second processing technique described in relation to FIGS. 8-12, and a third processing technique described in relation to FIGS. 13-17. The mono-signal processing techniques described herein each reduce the spatial interference typically caused by conventional signal processing techniques by differing amounts. Each processing technique also has particular advantages and disadvantages relative to the other processing techniques described herein.

First Processing Technique

In general, the first processing technique is implemented by a processor to cause a first driver and a second driver of a same audio output device (e.g., residing within the same housing of the audio output device) to output a first frequency range (e.g., low frequency range below a critical frequency Fc) of a single audio channel with a same first power output. That is, below the critical frequency Fc, the power output level of the first driver and the second driver of the audio output device is the same or similar. The first processing technique is implemented by the processor to also cause the first driver and the second driver of the same audio output device to output a second frequency range (e.g., high frequency range above a critical frequency Fc) of the single audio channel with different power outputs. In particular, the processor causes the first driver to output the second frequency range with a second power output and causes the second driver to output the second frequency range with a third power output that is higher than the second power output. In these embodiments, the processor causes the second driver to output the second frequency range with a significantly higher power output than the first driver (e.g., not having the first driver output audio sound in the second frequency range above the critical frequency Fc).

The critical frequency Fc can be based on a physical distance d between the first driver and the second driver within the same audio output device 100 (e.g., within the housing of the same audio output device 100). In particular, the critical frequency Fc=343/(4*d), where distance d is in meters (m). For example, if the physical distance between the two drivers is 0.15 m, then the critical frequency Fc equals 571.7 Hz. In the embodiments described herein, the distance d between the two drivers is 0.15 m and the critical frequency Fc is 571.7 Hz. In other embodiments, other values for the distance d between the two drivers and the critical frequency Fc can be used.

Advantageously, the spatial interference caused by the first processing technique is greatly reduced in comparison to the spatial interference caused by conventional processing techniques since the first processing technique causes only the second driver to output the second frequency range (high frequency range) with any substantial power output, while causing the first driver to not output the second frequency range or output the second frequency range with minimal/nominal power output. As discussed above in relation to FIG. 2, the spatial interference caused by two drivers outputting the same audio channel is much greater in the high frequency range above the critical frequency Fc. By causing one of the drivers to not output the high frequency range or output the high frequency range with minimal/nominal power output, the first processing technique is able to greatly reduce spatial interference caused by the sound output of the two drivers. In addition, the third power output of the second driver for the second frequency range can also be significantly increased to compensate for the lack of power output by the second driver for the second frequency range and to increase the total power output of the two drivers, which improves system efficiency. For example, the third power output of the second driver for the second frequency range can be increased by a gain of +6 dB relative to the first power output of the first frequency range.

Figure 3:
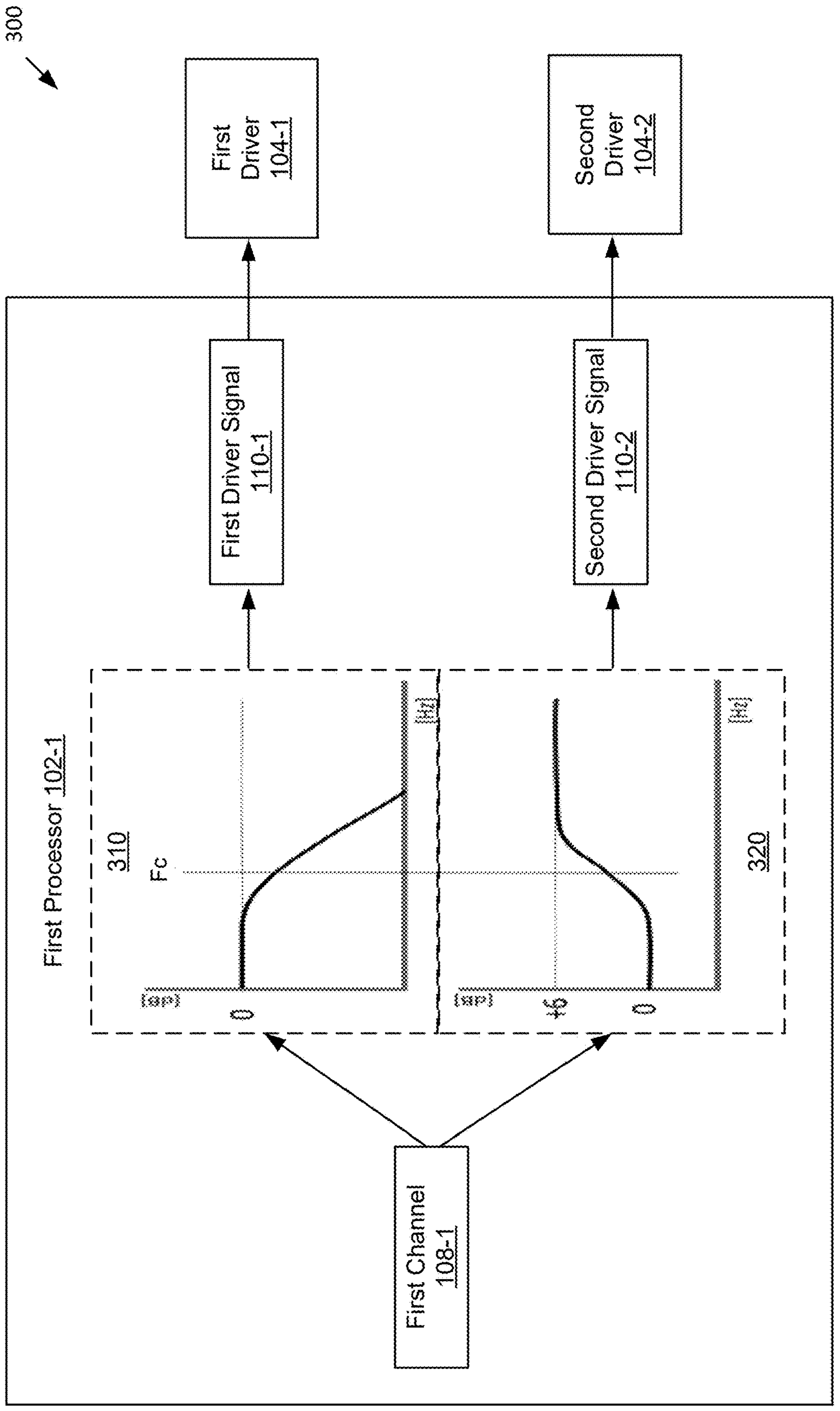
FIG. 3 illustrates a conceptual diagram of a first processing technique that can be implemented in the mono configuration system of FIG. 1, according to various embodiments.

FIG. 3 illustrates a conceptual diagram of a first processing technique 300 that can be implemented in the mono configuration system 101 of FIG. 1, according to various embodiments. The first processing technique can be implemented, for example, by a processor 102 of FIG. 1. As shown, the first processing technique 300 is executed by a first processor 102-1 of a first audio output device 100-1. In some embodiments, the first processing technique 300 is also executed by a second processor 102-2 of a second audio output device 100-2.

As shown, the processor 102-1 receives a single audio channel 108-1 (from the audio source 114) and processes the single audio channel 108-1 to generate a first driver signal 110-1 for the first driver 104-1 and a second driver signal 110-2 for the second driver 104-2. The processor 102-1 performs a first filtering process 310 to generate the first driver signal 110-1 and performs a second filtering process 320 to generate the second driver signal 110-2. The first filtering process 310 and the second filtering process 320 can each be implemented using various audio filters (e.g., band-pass filters, shelf filters, or the like) or using digital signal processing techniques that digitally generate such audio filters.

In general, the first filtering process 310 and the second filtering process 320 each receive an input audio signal having a particular power input level and applies levels of gain to the input audio signal to generate a modified output audio signal having a modified power output level, the modified output audio signal comprising a driver signal. In particular, the first filtering process 310 and the second filtering process 320 each receive the same audio channel signal 108-1 having a particular power input level and applies different levels of gain (different amplification/de-amplification levels) to the second frequency range of the same audio channel signal 108-1 to produce different driver signals 110-1, 110-2 having different power output levels for the second frequency range of the audio channel 108-1.

As shown, the first filtering process 310 passes through a first frequency range of the audio channel 108-1 below the critical frequency Fc with no gain (0 dB) to produce a first power output for the first frequency range. Since no gain is applied, the first power output for the first frequency range will equal the power input level for the first frequency range of the input audio channel 108-1. The first filtering process 310 also applies a large negative gain (such as −100 dB to −6 dB) to a second frequency range of the audio channel 108-1 above the critical frequency Fc to significantly reduce the power output for the second frequency range to a second power output. The resulting second power output is equal to no power output (0 dB) or equal to a minimal/nominal power output that is substantially equal to no power output (such as less than 10 dB), so that the first driver 104-1 does not output the second frequency range.

As shown, the second filtering process 310 also passes through the first frequency range of the audio channel 108-1 with no gain (0 dB) to produce a first power output for the first frequency range. However, the second filtering process 310 applies a significant positive gain (such as +3 to +6 dB) to the second frequency range of the audio channel 108-1 to significantly increase the power output for the second frequency range to a third power output. The third power output is higher than the first power output and significantly higher than the second power output.

The first filtering process 310 generates the first driver signal 110-1 and the second filtering process 320 generates the second driver signal 110-2, which causes the first driver 104-1 and the second driver 104-2, respectively, to each output the first frequency range of the audio channel 108-1 with a same first power output. The first driver signal 110-1 also causes the first driver 104-1 to output the second frequency range at a second power output (with minimal/nominal or no power output). The second driver signal 110-2 also causes the second driver 104-2 to output the second frequency range at a third power output that is significantly higher than the second power output. As shown, the filtering processes 310, 320 and drivers 104-1, 104-2 can exhibit a transitional frequency range in which, as the frequency increases, a power output of the first driver 104-1 decreases and the power output of the second driver 104-2 increases. In some embodiments, the phase shift caused by each of the two filters over a transition frequency range can be matched.

In alternative embodiments, when the audio output device 100 does not have enough headroom (such as +6 dB) to increase a power output of the second driver 104-2 in the second frequency range, the audio output device 100 can instead reduce a power output of the first frequency range for both the first driver 104-1 and the second driver 104-2. Reducing the gain of the first frequency range balances the power output of the first frequency range by both drivers with the power output of the second frequency range by the second driver 104-2.

Figure 4:
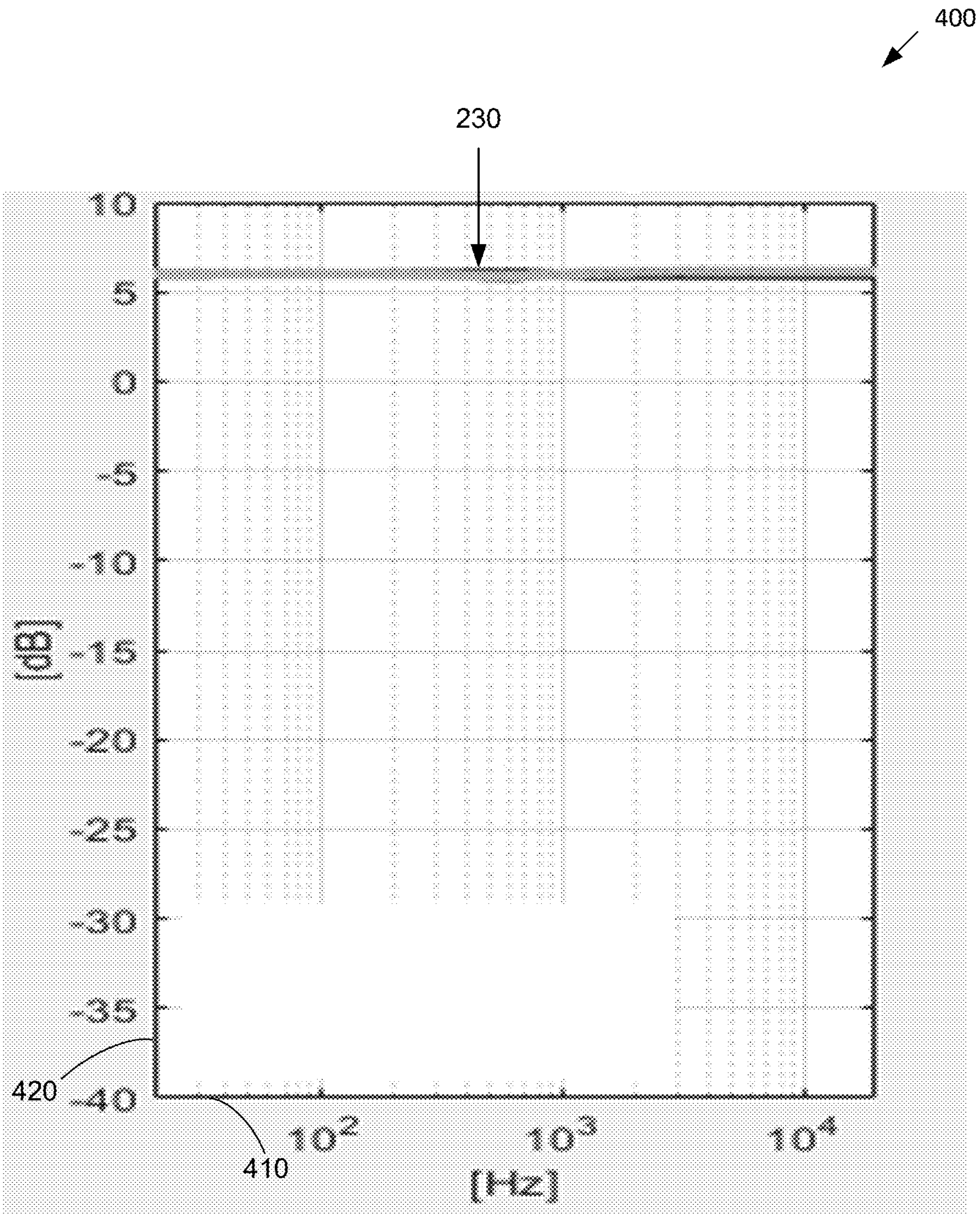
FIG. 4 is a frequency response graph that illustrates interference caused by implementing a first processing technique in the mono configuration system of FIG. 1, according to various embodiments.

FIG. 4 is a frequency response graph 400 that illustrates interference caused by implementing a first processing technique 300 in the mono configuration system 101 of FIG. 1, according to various embodiments. The frequency response graph 400 comprises a frequency (Hz) axis 410 and a gain level (dB) axis 420 that illustrates minimal spatial interference caused by the first processing technique 300. In comparison to the frequency response graph 200 of FIG. 2 that illustrates spatial interference caused by conventional signal processing techniques, it is evident that the spatial interference caused by the first processing technique 300 is almost entirely reduced or non-existent. The reduction of spatial interference shown in the frequency response graph 400 of FIG. 4 in the second frequency range (high frequency range) above the critical frequency Fc 230 is particularly evident in comparison to the frequency response graph 200 of FIG. 2. The reduced spatial interference caused by the first processing technique 300 greatly improves the quality of the audio sound that is output by the plurality of drivers 104-1, 104-2 of the audio output device 100-1 relative to conventional signal processing techniques.

Figure 5:
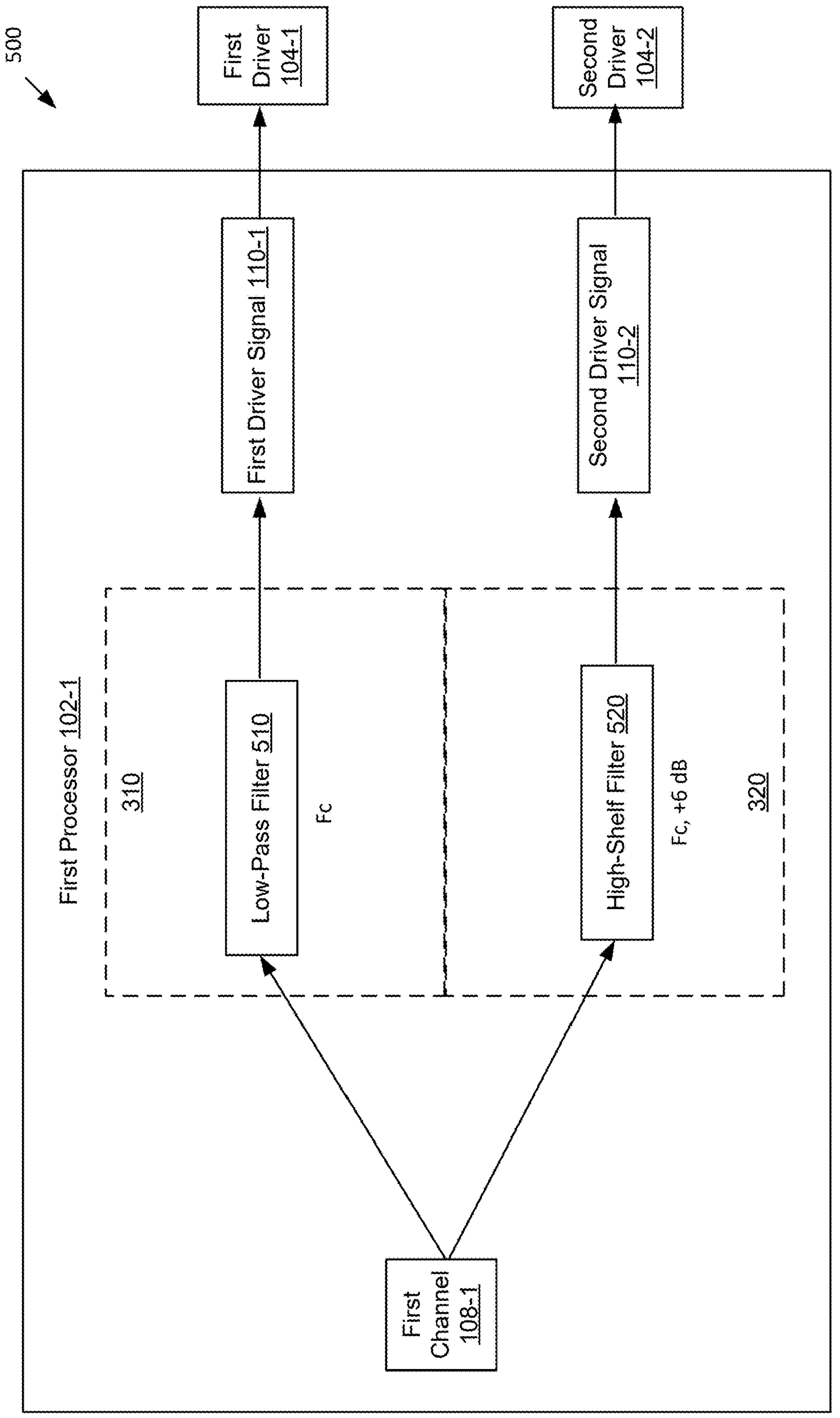
FIG. 5 illustrates a conceptual diagram of a first implementation of the first processing technique of FIG. 3, according to various embodiments.

FIG. 5 illustrates a conceptual diagram of a first implementation 500 of the first processing technique 300 of FIG. 3, according to various embodiments. As described below, FIGS. 5-6, 10-11, and 15-16 illustrate various implementations of the first processing technique, second processing technique, and the third processing technique. Each of the various implementations can be implemented by a processor 102 of FIG. 1, such as the first processor 102-1 of the first audio output device 100-1, the second processor 102-2 of the second audio output device 100-2 and/or the processor of the audio source 114 (for legacy audio output devices). Each of the various implementations can be implemented using various audio filters (e.g., band-pass filters, shelf filters, or the like) or using digital signal processing techniques that digitally generate such audio filters.

As shown, the processor 102-1 receives and processes a single audio channel 108-1 to generate a first driver signal 110-1 for the first driver 104-1. The processor 102-1 performs a first filtering process 310 to generate the first driver signal 110-1 by applying a low-pass filter 510 to the audio channel 108-1 with a selected cutoff frequency equal to the critical frequency Fc. As such, the low-pass filter 510 passes through only the first frequency range below the critical frequency Fc at a first power output with no gain. The output of the low-pass filter 510 comprises the first driver signal 110-1. The resulting first driver signal 110-1 carries a first frequency range below the critical frequency Fc at the first power output and a second frequency range above the critical frequency Fc at a second power output that is minimal or none. In this manner, the first driver 104-1 outputs the first frequency range with the first power output and outputs the second frequency range with the second power output. The second power output is equal to no power output (0 dB) or equal to a minimal/nominal power output that is substantially equal to no power output (such as less than 10 dB), so that the first driver 104-1 does not output the second frequency range.

As shown, the processor 102-1 also processes the single audio channel 108-1 to generate a second driver signal 110-2 for the second driver 104-2. The processor 102-1 performs a second filtering process 320 to generate the second driver signal 110-2 by applying a high-shelf filter 520 to the audio channel 108-1 with a selected cutoff frequency equal to the critical frequency Fc and a selected gain (such as +3 to +6 dB). As such, the high-shelf filter 520 passes through the first frequency range below the critical frequency Fc, while increasing the power output (such as by +3 to +6 dB) of the second frequency range above the critical frequency Fc. The output of the high-shelf filter 520 comprises the second driver signal 110-2. The resulting second driver signal 110-2 carries a first frequency range below the critical frequency Fc at the first power output and a second frequency range above the critical frequency Fc at a third power output having a significant gain relative to the first power output and the second power output. In this manner, the second driver 104-1 outputs the first frequency range with the first power output and outputs the second frequency range with the third power output that is significantly greater than the first power output and the second power output.

Figure 6:
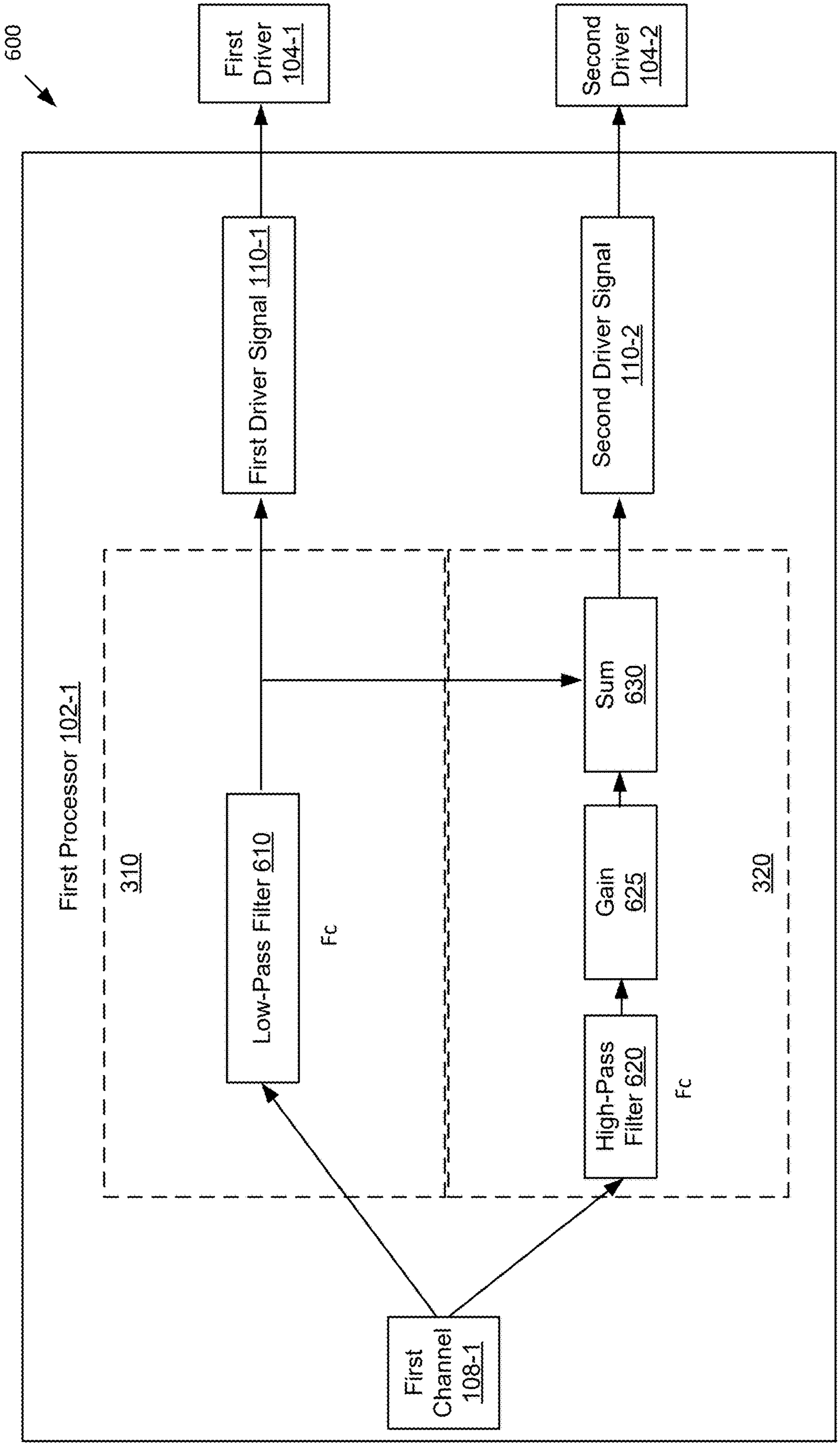
FIG. 6 illustrates a conceptual diagram of a second implementation of the first processing technique of FIG. 3, according to various embodiments.

FIG. 6 illustrates a conceptual diagram of a second implementation 600 of the first processing technique 300 of FIG. 3, according to various embodiments. The second implementation 600 can be implemented, for example, by a processor 102 of FIG. 1, such as the first processor 102-1 of the first audio output device 100-1, the second processor 102-2 of the second audio output device 100-2 and/or the processor of the audio source 114 (for legacy audio output devices).

As shown, the processor 102-1 receives and processes a single audio channel 108-1 to generate a first driver signal 110-1 for the first driver 104-1. The processor 102-1 performs a first filtering process 310 to generate the first driver signal 110-1 by applying a low-pass filter 610 to the audio channel 108-1 with a selected cutoff frequency equal to the critical frequency Fc. As such, the low-pass filter 610 passes through only the first frequency range below the critical frequency Fc at a first power output with no gain. The output of the low-pass filter 610 comprises the first driver signal 110-1. The resulting first driver signal 110-1 carries a first frequency range below the critical frequency Fc at the first power output and a second frequency range above the critical frequency Fc at a second power output that is minimal/nominal or no power output. In this manner, the first driver 104-1 outputs the first frequency range with the first power output and outputs the second frequency range with the second power output (minimal/nominal or no power output).

As shown, the processor 102-1 also processes the single audio channel 108-1 to generate a second driver signal 110-2 for the second driver 104-2. The processor 102-1 performs a second filtering process 320 to generate the second driver signal 110-2 by applying a high-pass filter 620, a gain component 625, and a summing component 630. The high-pass filter 620 is applied to the audio channel 108-1 with a selected cutoff frequency equal to the critical frequency Fc. As such, the high-pass filter 620 passes through only the second frequency range above the critical frequency Fc at the first power output with no gain. The gain component 625 is applied to the output of the high-pass filter 620 to increase the gain of the second frequency range to a third power output (such as by +3 to +6 dB above the first power output). The summing component 630 then receives and sums the output of the gain component 625 and the output of the low-pass filter 610 to generate the second driver signal 110-2. The output of the summing component 630 comprises the second driver signal 110-2. The resulting second driver signal 110-2 carries a first frequency range at the first power output and the second frequency range at a third power output. In this manner, the second driver 104-1 outputs the first frequency range with the first power output and outputs the second frequency range with the third power output that is significantly greater than the first power output and the second power output.

Figure 7:
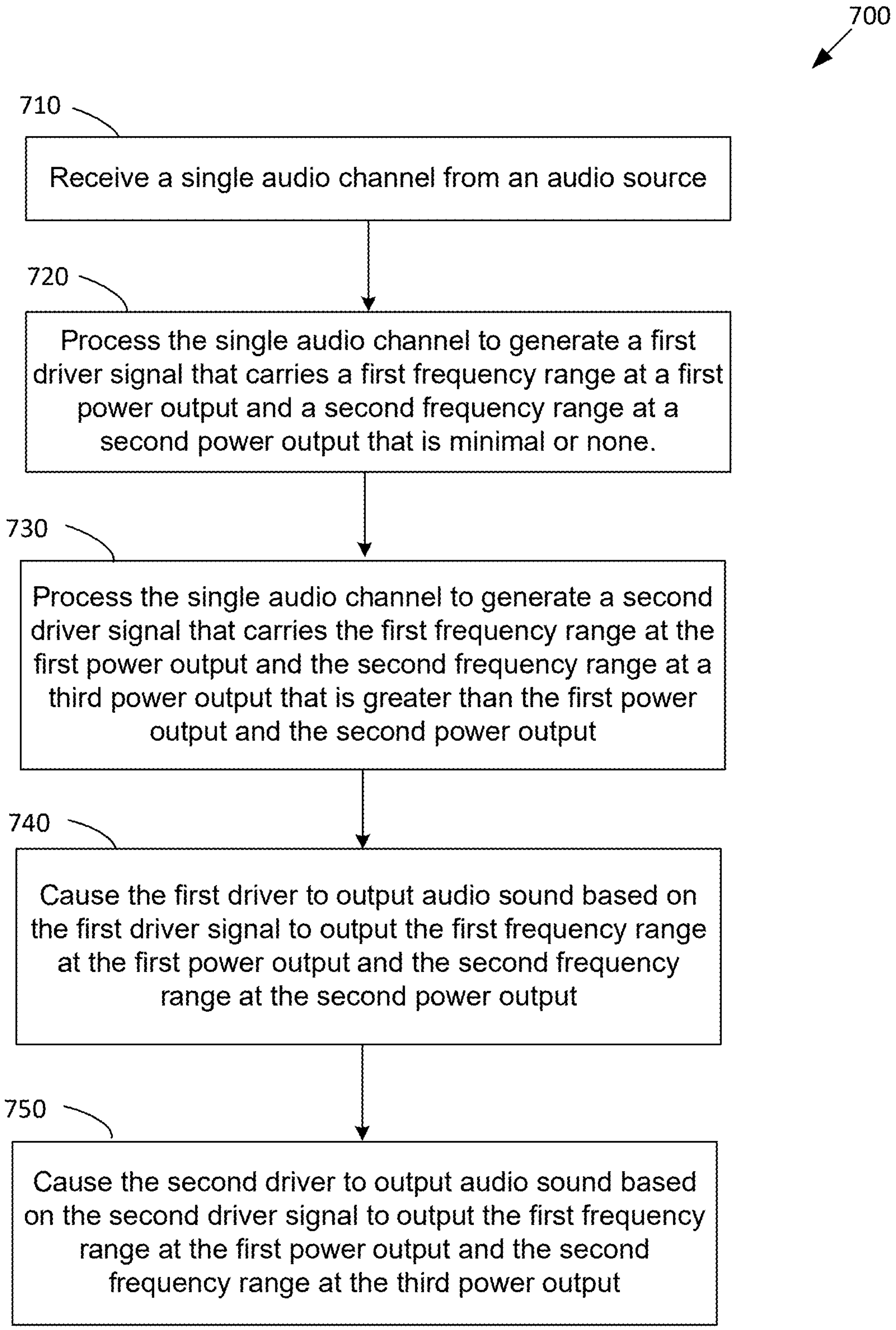
FIG. 7 is a flow diagram of method steps for the first processing technique of FIG. 3, according to various embodiments.

FIG. 7 is a flow diagram of method steps for the first processing technique 300 of FIG. 3, according to various embodiments. Although the method steps are described in conjunction with the systems of FIGS. 1-6, persons skilled in the art will understand that any system configured to perform the method steps, in any order, falls within the scope of the various embodiments. A method 700 for the first processing technique can be implemented, for example, by a processor 102 of FIG. 1, such as the first processor 102-1 of the first audio output device 100-1, the second processor 102-2 of the second audio output device 100-2, or the processor of audio source 114 (for legacy audio output devices). In some embodiments, the method 700 for the first processing technique 300 is implemented by the processor 102 to generate a first driver signal 110-1 for a first driver 104-1 and a second driver signal 110-2 for a second driver 104-2, wherein the first driver 104-1 and the second driver 104-2 physically reside within a housing of a same audio output device 100-1.

As shown, the method 700 begins at step 710, where the processor 102 receives an audio signal 106 from an audio source 114, the audio signal 106 comprising a single audio channel (such as a first audio channel 108-1). The processor 102 then processes (at step 720) the single audio channel 108-1 to generate a first driver signal 110-1 that carries a first frequency range (e.g., a low frequency range) below a critical frequency Fc at a first power output and a second frequency range (e.g., a high frequency range) above the critical frequency Fc at a second power output (e.g., no power output or minimal/nominal power output such as 10 dB or less). The second power output is significantly lower than the first power output. The processor 102 then processes (at step 730) the single audio channel 108-1 to generate the second driver signal 110-2 so that the second driver signal 110-2 carries the first frequency range at the first power output and the second frequency range at a third power output that is significantly greater than the first power output and the second power output.

The processor 102 causes (at step 740) the first driver 104-1 to output audio sound based on the first driver signal 110-1, whereby the first driver 104-1 outputs the first frequency range at the first power output and outputs the second frequency range at the second power output that is lower than the first power output. The processor 102 also causes (at step 750) the second driver 104-2 to output audio sound based on the second driver signal 110-2, whereby the second driver 104-2 outputs the first frequency range at the first power output and outputs the second frequency range at the third power output that is greater than both the first power output and the second power output.

By implementing the method 700 of the first processing technique, the processor 102 causes the first driver and the second driver of a same audio output device to output a first frequency range (e.g., a low frequency range) of a single audio channel with a same or similar first power output and output a second frequency range (e.g., a high frequency range) of the single audio channel with different power outputs. In these embodiments, the processor causes the first driver to output the second frequency range with a second power output and causes the second driver to output the second frequency range with a third power output that is significantly greater than the second power output. Advantageously, the first processing technique greatly reduces the spatial interference caused by conventional signal processing techniques by causing only one driver of a plurality of drivers of a same audio output device to output the high frequency range with any substantial power output, while causing the other driver to not output the high frequency range or output the high frequency range with minimal/nominal power output (such as less than 10 dB). In addition, the third power output of the second driver for the second frequency range can also be significantly increased to compensate for the lack of power output by the second driver for the second frequency range and to increase the total power output of the two drivers, which improves system efficiency.

Second Processing Technique

In general, the second processing technique is a modification of the first processing technique. The second processing technique is implemented by a processor to cause a first driver and a second driver of a same audio output device to output a first frequency range (e.g., low frequency range below a critical frequency Fc) of a single audio channel with a same first power output. That is, below the critical frequency Fc, the power output level of the first driver and the second driver of the audio output device is the same or similar. The second processing technique is implemented by the processor to also cause the first driver and the second driver of the same audio output device to output a second frequency range (e.g., high frequency range above a critical frequency Fc) of the single audio channel with different power outputs. The processor causes the first driver to output the second frequency range with a second power output and causes the second driver to output the second frequency range with a third power output that is higher than the second power output. In particular, above the critical frequency Fc, the processor decreases the power output of the first driver (e.g., by −6 dB) and/or increases the power output of the second driver (e.g., by +3 dB), thereby creating a power output difference between the two drivers. In various embodiments, the power output of the drivers is adjusted so that the power output difference between the second and third power outputs of the two drivers exceeds a predetermined power difference threshold (e.g., 8 dB) across at least a portion of the second frequency range, whereby the power output difference is consistent (the same or similar) across at least the portion of the second frequency range (the power output difference does not substantially change across at least the portion of the second frequency range).

Advantageously, the spatial interference caused by the second processing technique is significantly reduced in comparison to the spatial interference caused by conventional processing techniques, since the second processing technique causes the first driver to output the second frequency range with a significantly lower power output than the second driver outputting the second frequency range. By causing one of the drivers to output the high frequency range with a significantly lower power output, the second processing technique is able to significantly reduce spatial interference caused by the sound output of the two drivers. However, the second processing technique reduces the spatial interference to a lesser degree than the first processing technique, since the second processing technique decreases the power output of the first driver for the second frequency range to a lesser degree than the first processing technique. In particular, the first processing technique decreases the power output of the first driver for the second frequency range to a minimal/nominal power output or to no power output, whereas the second processing technique decreases the power output of the first driver for the second frequency range to a lower power output level (e.g., by −6 dB) that is still greater than a minimal/nominal power output, thereby causing more spatial interference than the first processing technique. However, since the second processing technique decreases the power output of the first driver for the second frequency range to a lesser degree than the first processing technique, the second processing technique provides higher total power output from the two drivers than the first processing technique, which improves system efficiency.

Figure 8:
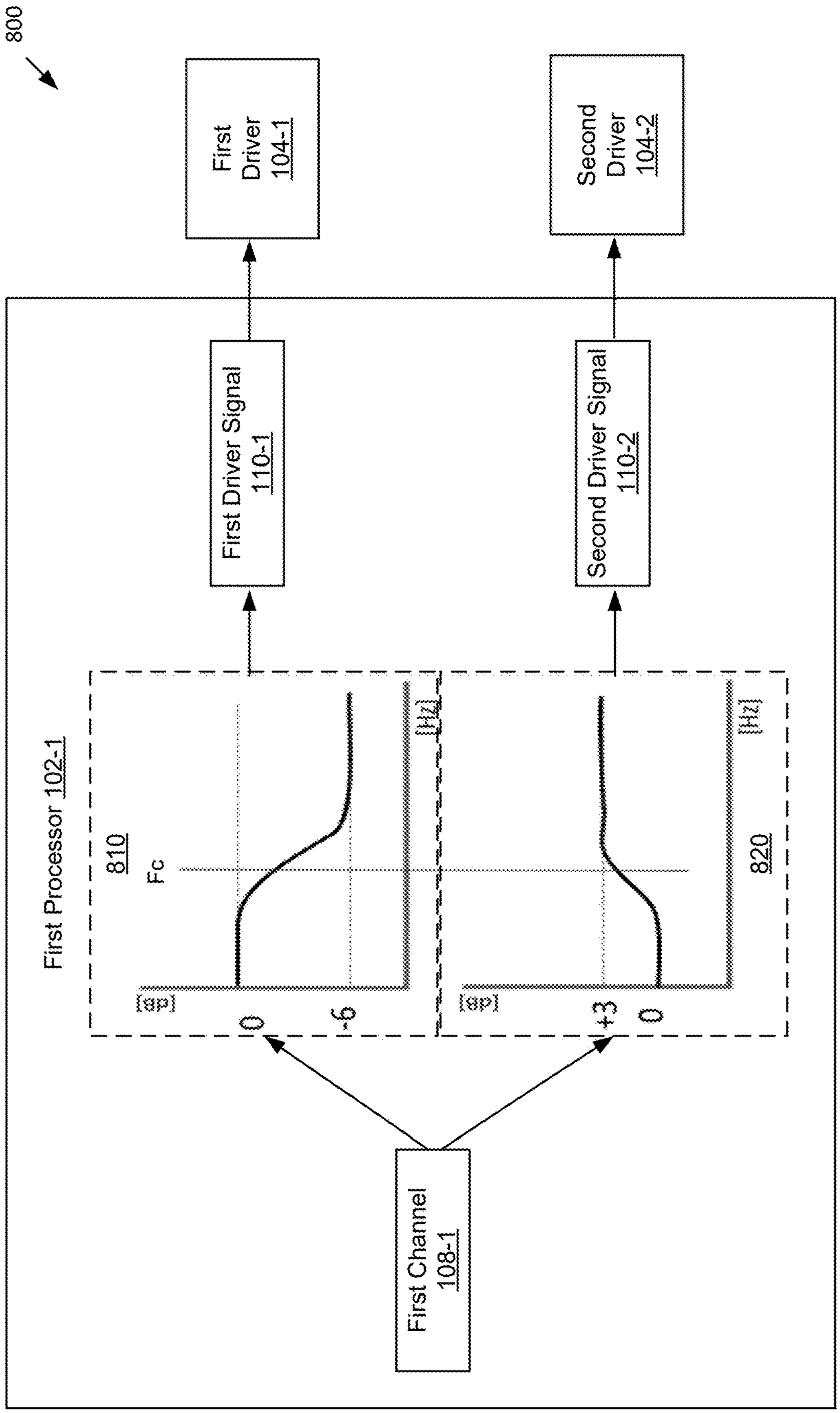
FIG. 8 illustrates a conceptual diagram of a second processing technique that can be implemented in the mono configuration system of FIG. 1, according to various embodiments.

FIG. 8 illustrates a conceptual diagram of a second processing technique 800 that can be implemented in the mono configuration system 101 of FIG. 1, according to various embodiments. The second processing technique 800 can be implemented, for example, by a processor 102 of FIG. 1. As shown, the second processing technique 800 is executed by a first processor 102-1 of a first audio output device 100-1. In some embodiments, the second processing technique 800 is also executed by a second processor 102-2 of a second audio output device 100-2.

As shown, the processor 102-1 receives a single audio channel 108-1 (from the audio source 114) and processes the single audio channel 108-1 to generate a first driver signal 110-1 for the first driver 104-1 and a second driver signal 110-2 for the second driver 104-2. The processor 102-1 performs a first filtering process 810 to generate the first driver signal 110-1 and performs a second filtering process 820 to generate the second driver signal 110-2. The first filtering process 810 and the second filtering process 820 can each be implemented using various audio filters (e.g., band-pass filters, shelf filters, or the like) or using digital signal processing techniques that digitally generate such audio filters.

In general, the first filtering process 810 and the second filtering process 820 each receive an input audio signal having a particular power input level and applies levels of gain to the input audio signal to generate a modified output audio signal having a modified power output level, the modified output audio signal comprising a driver signal. In particular, the first filtering process 810 and the second filtering process 820 each receive the same audio channel signal 108-1 having a particular power input level and applies different levels of gain (different amplification/de-amplification levels) to the second frequency range of the same audio channel signal 108-1 to produce different driver signals 110-1, 110-2 having different power output levels for the second frequency range of the audio channel 108-1.

As shown, the first filtering process 810 passes through a first frequency range of the audio channel 108-1 below the critical frequency Fc with no gain (0 dB) to produce a first power output for the first frequency range. Since no gain is applied, the first power output for the first frequency range will equal the power input level for the first frequency range of the input audio channel 108-1. The first filtering process 810 also applies a large negative gain (such as −6 to −3 dB) to a second frequency range of the audio channel 108-1 above the critical frequency Fc to significantly reduce the power output for the second frequency range to a second power output. The resulting second power output is greater than a minimal/nominal power output and is kept the same or similar across at least the portion of the second frequency range, so that the first driver 104-1 outputs the second frequency range at some audible power output level.

As shown, the second filtering process 810 also passes through the first frequency range of the audio channel 108-1 with no gain (0 dB) to produce a first power output for the first frequency range. However, the second filtering process 310 applies a significant positive gain (such as +3 to +6 dB) to the second frequency range of the audio channel 108-1 to significantly increase the power output for the second frequency range to a third power output. The third power output is higher than the first power output and significantly higher than the second power output.

In various embodiments, the resulting first driver signal 110-1 carries the second frequency range with the second power output that is consistent (the same or similar) across at least a portion of the second frequency range (the second power output does not substantially change across at least the portion of the second frequency range). In addition, the resulting second driver signal 110-2 carries the second frequency range with the third power output that is the same or similar across at least the portion of the second frequency range (the third power output does not substantially change across at least the portion of the second frequency range). As such, the resulting first driver signal 110-1 and second driver signal 110-2 carries the second frequency range with a power output difference between the second and third power outputs of the two driver signals that exceeds a predetermined power difference threshold (e.g., 8 dB) across at least a portion of the second frequency range. As shown, the power output difference between the second and third power outputs is the same or similar across at least the portion of the second frequency range (the power output difference does not substantially change across at least the portion of the second frequency range).

The first filtering process 810 generates the first driver signal 110-1 and the second filtering process 820 generates the second driver signal 110-2, which causes the first driver 104-1 and the second driver 104-2, respectively, to each output the first frequency range of the audio channel 108-1 with a same first power output. The first driver signal 110-1 also causes the first driver 104-1 to output the second frequency range at a second power output. The second driver signal 110-2 also causes the second driver 104-2 to output the second frequency range at a third power output that is higher than the second power output and the first power output. The first driver 104-1 and the second driver 104-2 outputs the second frequency range with a power output difference between the second and third power outputs of the two driver signals that exceeds a power difference threshold (e.g., 8 dB) across at least a portion of the second frequency range, whereby the power output difference is consistent and does not substantially change across at least the portion of the second frequency range. As shown, the filtering processes 810, 820 and drivers 104-1, 104-2 can exhibit a transitional frequency range in which, as the frequency increases, a power output of the first driver 104-1 decreases and the power output of the second driver 104-2 increases.

Figure 9:
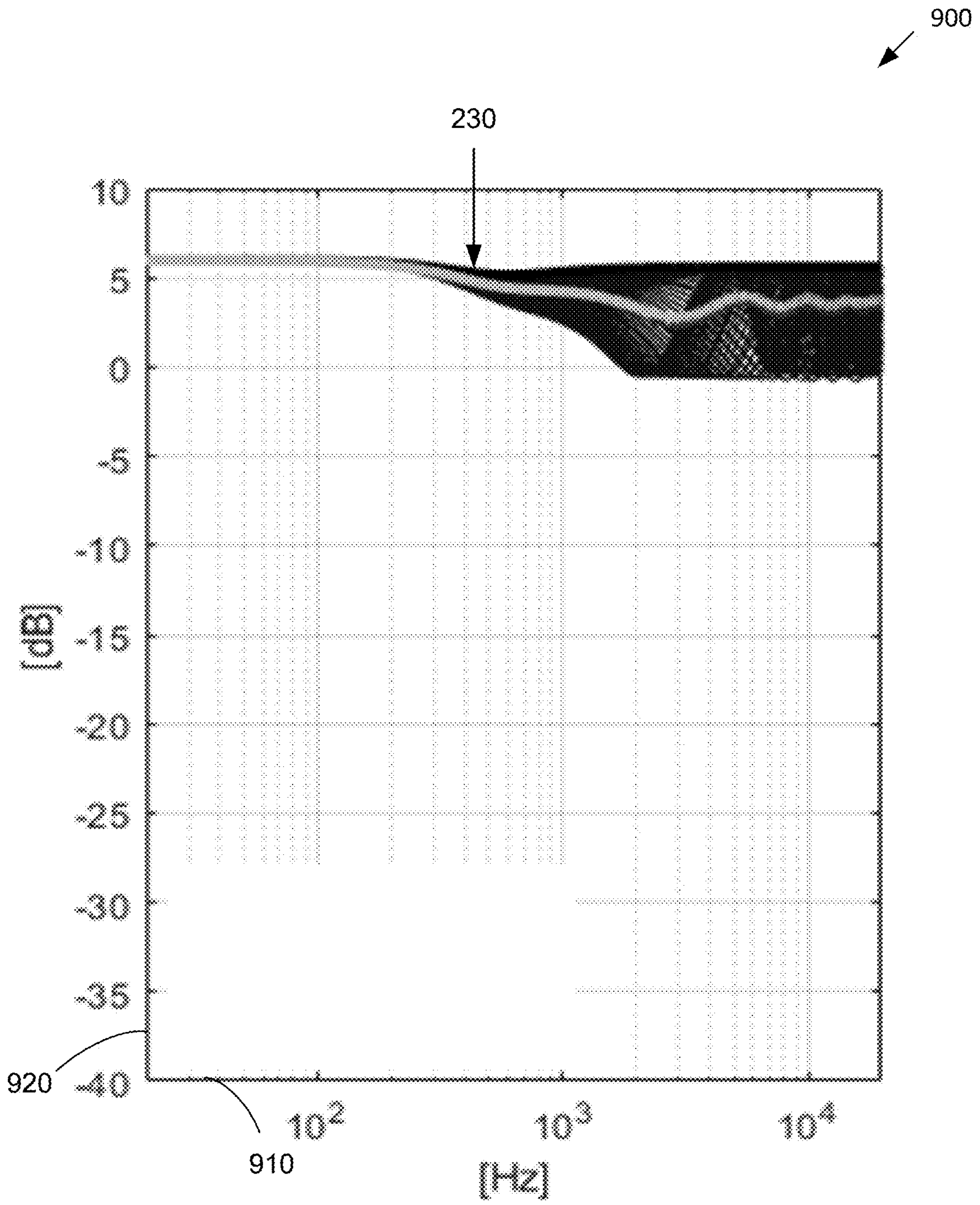
FIG. 9 is a frequency response graph that illustrates interference caused by implementing a second processing technique in the mono configuration system of FIG. 1, according to various embodiments.

FIG. 9 is a frequency response graph 900 that illustrates interference caused by implementing a second processing technique 800 in the mono configuration system 101 of FIG. 1, according to various embodiments. The frequency response graph 900 comprises a frequency (Hz) axis 910 and a gain level (dB) axis 920 that illustrates spatial interference caused by the second processing technique 800. In comparison to the frequency response graph 200 of FIG. 2 that illustrates spatial interference caused by conventional signal processing techniques, it is evident that the spatial interference caused by the second processing technique 800 is significantly reduced. The reduction of spatial interference shown in the frequency response graph 900 of FIG. 9 in the second frequency range (high frequency range) above the critical frequency Fc 230 is particularly evident in comparison to the frequency response graph 200 of FIG. 2. The reduced spatial interference caused by the second processing technique 800 significantly improves the quality of the audio sound that is output by the plurality of drivers 104-1, 104-2 of the audio output device 100-1 relative to conventional signal processing techniques.

Figure 10:
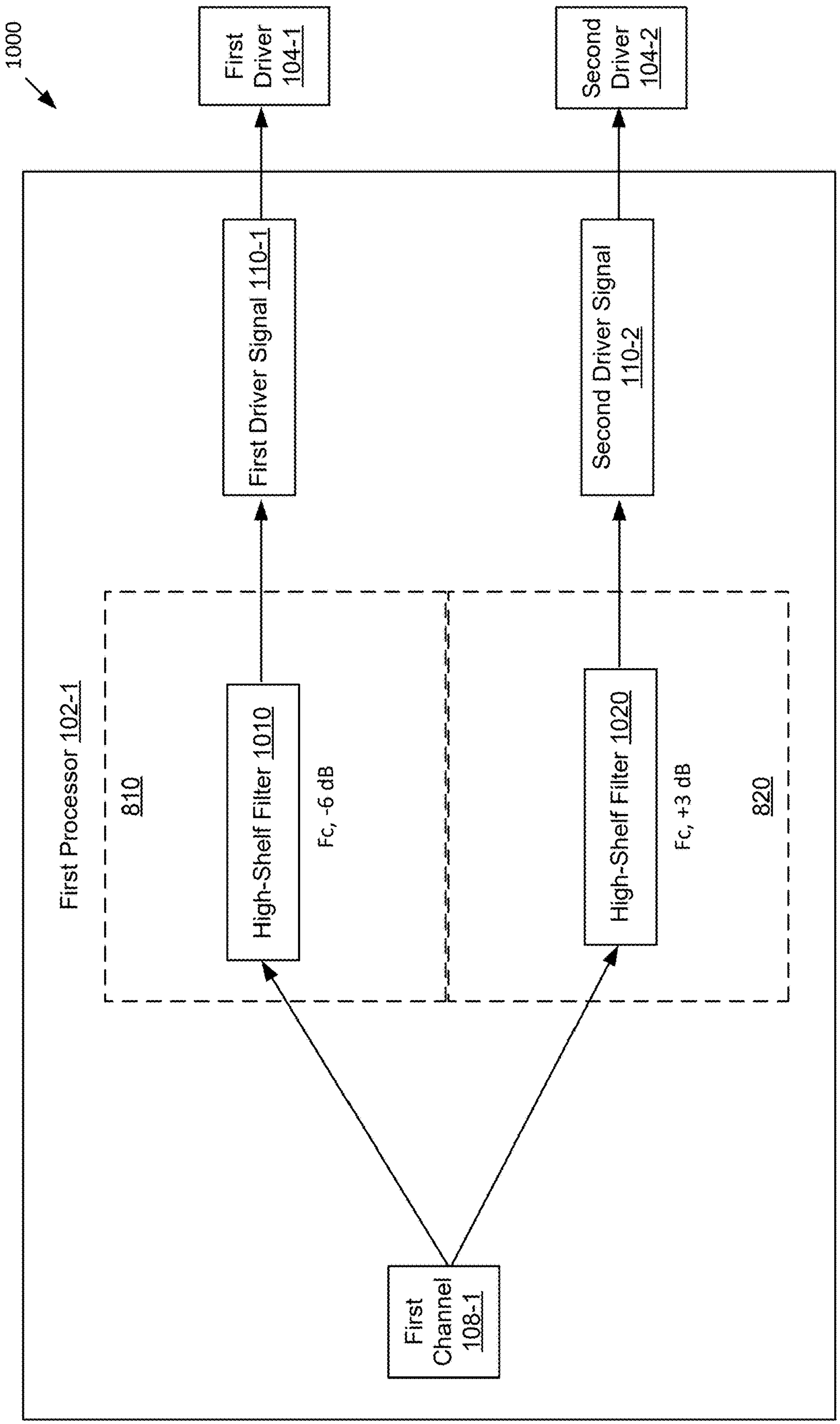
FIG. 10 illustrates a conceptual diagram of a first implementation of the second processing technique of FIG. 8, according to various embodiments.

FIG. 10 illustrates a conceptual diagram of a first implementation 1000 of the second processing technique 800 of FIG. 8, according to various embodiments. The first implementation 1000 can be implemented, for example, by a processor 102 of FIG. 1, such as the first processor 102-1 of the first audio output device 100-1, the second processor 102-2 of the second audio output device 100-2 and/or the processor of the audio source 114 (for legacy audio output devices).

As shown, the processor 102-1 receives and processes a single audio channel 108-1 to generate a first driver signal 110-1 for the first driver 104-1. The processor 102-1 performs a first filtering process 810 to generate the first driver signal 110-1 by applying a first high-shelf filter 1010 to the audio channel 108-1 with a selected cutoff frequency equal to the critical frequency Fc and a selected gain (such as −3 to −6 dB). As such, the first high-shelf filter 1010 passes through the first frequency range below the critical frequency Fc, while decreasing the power output of the second frequency range above the critical frequency Fc. The output of the first high-shelf filter 1010 comprises the first driver signal 110-1. The resulting first driver signal 110-1 carries a first frequency range below the critical frequency Fc at a first power output and a second frequency range above the critical frequency Fc at a lower second power output that does not substantially change across at least the portion of the second frequency range. In this manner, the first driver 104-1 outputs the first frequency range with the first power output and outputs the second frequency range with the second power output.

As shown, the processor 102-1 also processes the single audio channel 108-1 to generate a second driver signal 110-2 for the second driver 104-2. The processor 102-1 performs a second filtering process 820 to generate the second driver signal 110-2 by applying a second high-shelf filter 1020 to the audio channel 108-1 with a selected cutoff frequency equal to the critical frequency Fc and a selected gain (such as +3 dB). As such, the second high-shelf filter 1020 passes through the first frequency range below the critical frequency Fc, while increasing the power output (such as +3 dB) of the second frequency range above the critical frequency Fc. The output of the second high-shelf filter 1020 comprises the second driver signal 110-2. The resulting second driver signal 110-2 carries a first frequency range below the critical frequency Fc at the first power output and a second frequency range above the critical frequency Fc at a higher third power output that does not substantially change across at least the portion of the second frequency range. In this manner, the second driver 104-1 outputs the first frequency range with the first power output and outputs the second frequency range with the third power output. In various embodiments, the power output difference between the two drivers exceeds a predetermined power difference threshold (e.g., 8 dB) across at least a portion of the second frequency range, whereby the power output difference does not substantially increase or decrease across at least the portion of the second frequency range.

Figure 11:
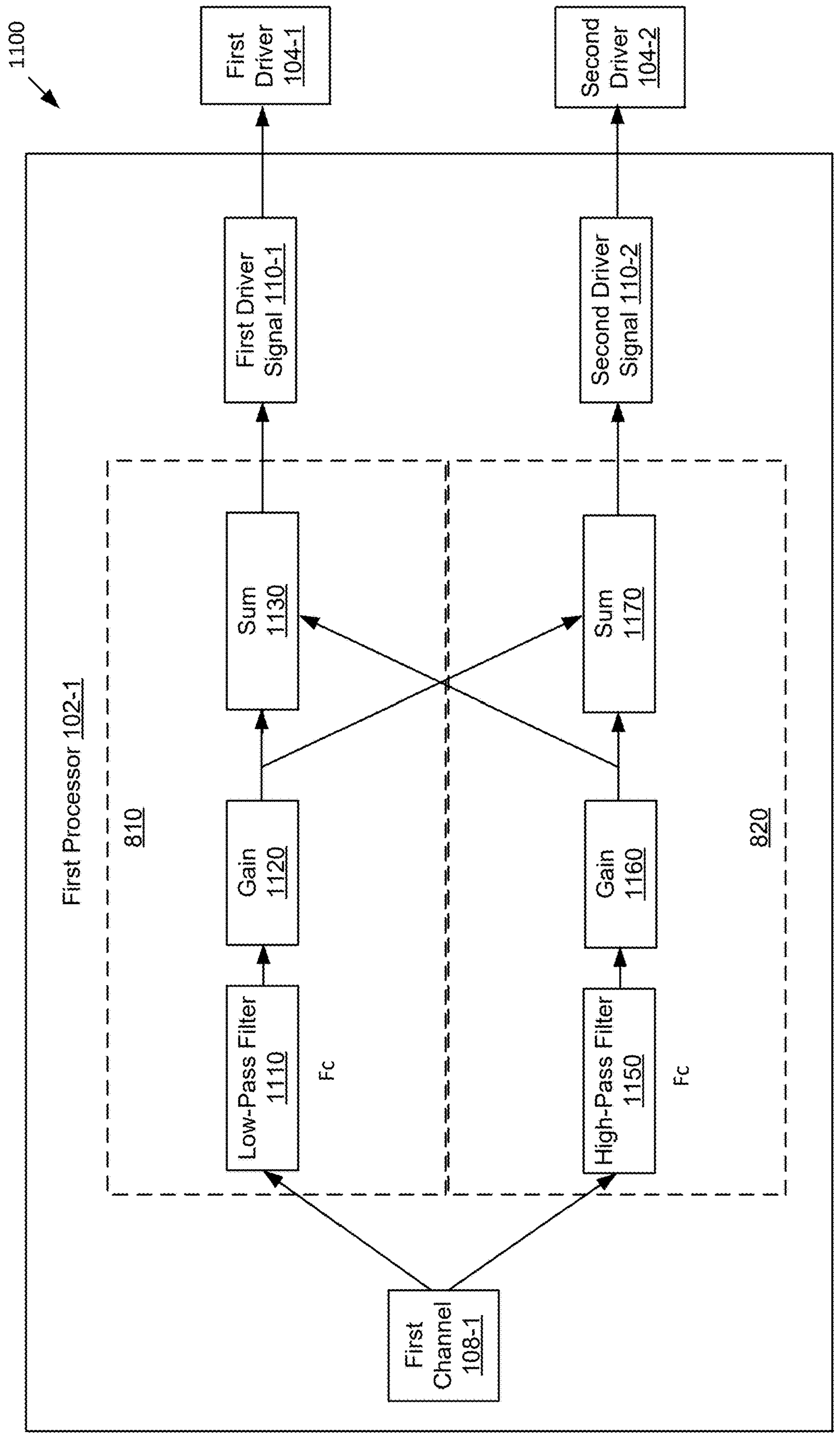
FIG. 11 illustrates a conceptual diagram of a second implementation of the second processing technique of FIG. 8, according to various embodiments.

FIG. 11 illustrates a conceptual diagram of a second implementation 1100 of the second processing technique 800 of FIG. 8, according to various embodiments. The second implementation 1100 can be implemented, for example, by a processor 102 of FIG. 1, such as the first processor 102-1 of the first audio output device 100-1, the second processor 102-2 of the second audio output device 100-2 and/or the processor of the audio source 114 (for legacy audio output devices). The second implementation 1100 includes a low-pass filter 1110, a first gain component 1120, a first summing component 1130, high-pass filter 1150, a second gain component 1160, and a second summing component 1170.

As shown, the processor 102-1 processes a single audio channel 108-1 to generate a first driver signal 110-1 for the first driver 104-1. The processor 102-1 performs a first filtering process 810 to generate the first driver signal 110-1 by applying the low-pass filter 1110 to the audio channel 108-1 with a selected cutoff frequency equal to the critical frequency Fc. The first gain component 1120 is applied to the output of the low-pass filter 1110 with a selected gain. The first summing component 1130 then receives and sums the output of the first gain component 1120 and the output of the second gain component 1160. The output of the first summing component 1130 comprises the first driver signal 110-1.

As shown, the processor 102-1 also processes the single audio channel 108-1 to generate a second driver signal 110-2 for the second driver 104-2. The processor 102-1 performs a second filtering process 820 to generate the second driver signal 110-2 by applying the high-pass filter 1150 to the audio channel 108-1 with a selected cutoff frequency equal to the critical frequency Fc. The second gain component 1160 is applied to the output of the high-pass filter 1150 with a selected gain. The second summing component 1170 then receives and sums the output of the first gain component 1120 and the output of the second gain component 1160. The output of the second summing component 1170 comprises the second driver signal 110-2.

Figure 12:
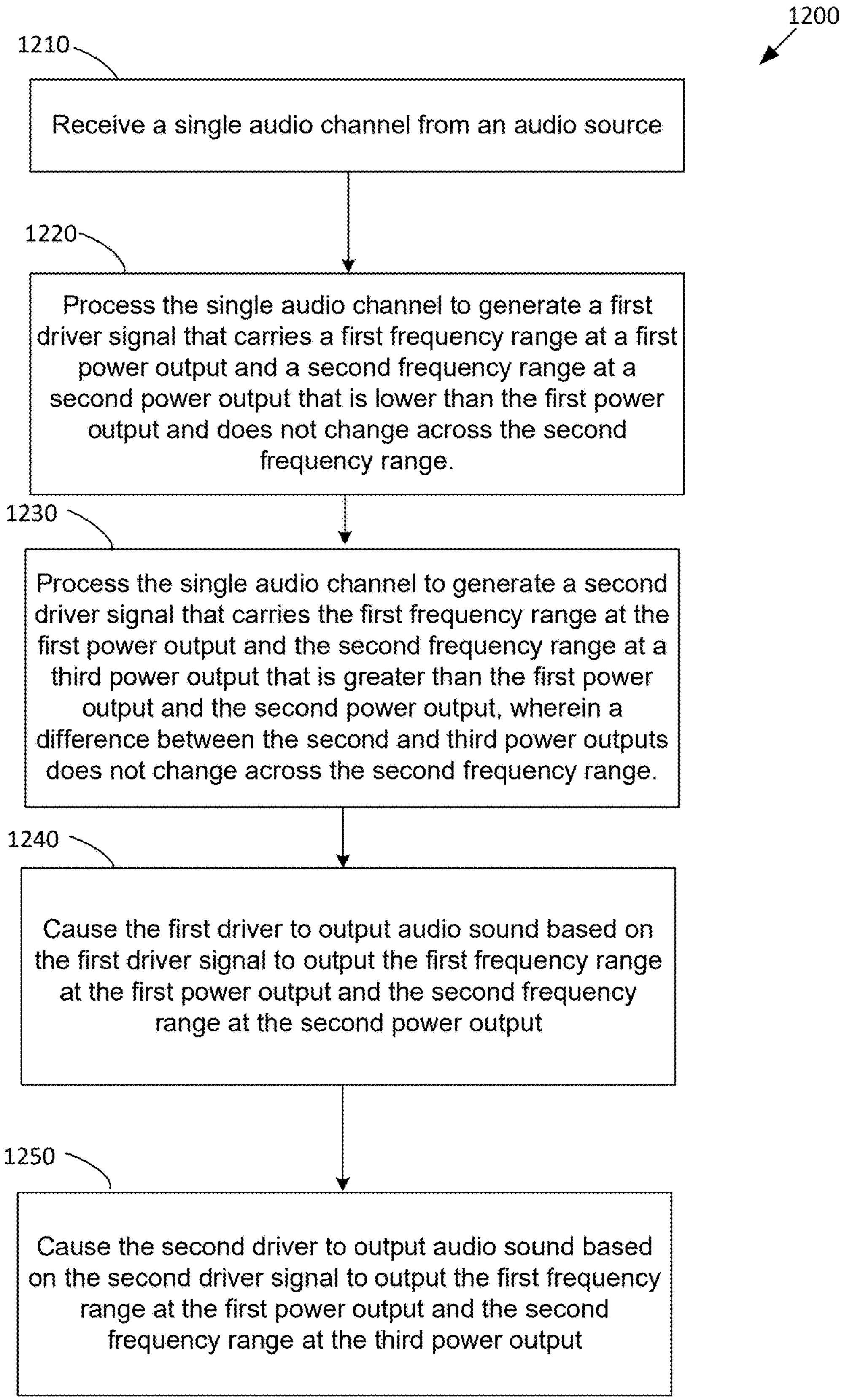
FIG. 12 is a flow diagram of method steps for the second processing technique of FIG. 8, according to various embodiments.

FIG. 12 is a flow diagram of method steps for the second processing technique 800 of FIG. 8, according to various embodiments. Although the method steps are described in conjunction with the systems of FIGS. 1-6 and 8-11, persons skilled in the art will understand that any system configured to perform the method steps, in any order, falls within the scope of the various embodiments. A method 1200 for the second processing technique can be implemented, for example, by a processor 102 of FIG. 1, such as the first processor 102-1 of the first audio output device 100-1, the second processor 102-2 of the second audio output device 100-2, or the processor of audio source 114 (for legacy audio output devices). In some embodiments, the method 1200 for the second processing technique 800 is implemented by the processor 102 to generate a first driver signal 110-1 for a first driver 104-1 and a second driver signal 110-2 for a second driver 104-2, wherein the first driver 104-1 and the second driver 104-2 physically reside within a housing of a same audio output device 100-1.

As shown, the method 1200 begins at step 1210, where the processor 102 receives an audio signal 106 from an audio source 114, the audio signal 106 comprising a single audio channel (such as a first audio channel 108-1). The processor 102 then processes (at step 1220) the single audio channel 108-1 to generate a first driver signal 110-1 that carries a first frequency range (e.g., a low frequency range) below a critical frequency Fc at a first power output and a second frequency range (e.g., a high frequency range) above the critical frequency Fc at a second power output. The second power output is significantly lower than the first power output and does not substantially change across at least the portion of the second frequency range.

The processor 102 then processes (at step 1230) the single audio channel 108-1 to generate the second driver signal 110-2 so that the second driver signal 110-2 carries the first frequency range at the first power output and the second frequency range at a third power output that is significantly greater than the second power output (such as +8 dB or more). The third power output is also significantly greater than the first power output (such as +3 dB). The resulting first driver signal 110-1 and second driver signal 110-2 carries the second frequency range with a power output difference between the two driver signals that exceeds a predetermined power difference threshold (e.g., 8 dB) across at least a portion of the second frequency range, wherein the power output difference does not substantially change across at least the portion of the second frequency range.

The processor 102 causes (at step 1240) the first driver 104-1 to output audio sound based on the first driver signal 110-1, whereby the first driver 104-1 outputs the first frequency range at the first power output and outputs the second frequency range at the second power output that is lower than the first power output. The processor 102 also causes (at step 1250) the second driver 104-2 to output audio sound based on the second driver signal 110-2, whereby the second driver 104-2 outputs the first frequency range at the first power output and outputs the second frequency range at the third power output that is greater than both the first power output and the second power output. The first driver 104-1 and the second driver 104-2 outputs the second frequency range with a power output difference between the two driver signals that exceeds a power difference threshold (e.g., 8 dB) across at least a portion of the second frequency range, whereby the power output difference does not substantially change across at least the portion of the second frequency range.

By implementing the method 1200 of the second processing technique, the processor 102 causes the first driver and the second driver of a same audio output device to output a first frequency range (e.g., a low frequency range) of a single audio channel with a same or similar first power output and output a second frequency range (e.g., a high frequency range) of the single audio channel with different power outputs. In these embodiments, the processor causes the first driver to output the second frequency range with a second power output and causes the second driver to output the second frequency range with a third power output that is significantly greater than the second power output. Advantageously, the second processing technique significantly reduces the spatial interference caused by conventional signal processing techniques by causing one driver of a plurality of drivers of a same audio output device to output the high frequency range with substantial power output, while causing the other driver to output the high frequency range with a significantly lower power output. In addition, the third power output of the second driver for the second frequency range can also be significantly increased to compensate for the lack of power output by the second driver for the second frequency range and to increase the total power output of the two drivers, which improves system efficiency.

Third Processing Technique

In general, the third processing technique is a modification of the second processing technique. The third processing technique includes the second processing technique which defines a first frequency range below a critical frequency Fc and a second frequency range above a critical frequency Fc. The third processing technique defines the second frequency range as being above a critical frequency Fc and below a second critical frequency Fc2, and introduces a third frequency range above the second critical frequency Fc2. The third processing technique is based on the idea that spatial interference is less audible at higher frequencies. Therefore, in the third frequency range above the second critical frequency Fc2, the power output of the first and second drivers can return to the default power output associated with the first frequency range. As used in relation to the third processing technique, a first power output of the first and second drivers is associated with the first frequency range, a second power output of the first driver is associated with the second frequency range, a third power output of the second driver is associated with the second frequency range, and a fourth power output of the first and second drivers is associated with the third frequency range, the fourth power output being the same as the first power output.

The third processing technique is implemented by a processor to cause a first driver and a second driver of a same audio output device to output a first frequency range below a first critical frequency Fc1 of a single audio channel with a same or similar first power output. The processor also causes the first driver and the second driver to output a second frequency range above the first critical frequency Fc1 and below a second critical frequency Fc2 of the single audio channel with different power outputs. In the second frequency range, the processor decreases the power output of the first driver (e.g., by −6 dB) to a second power output and/or increases the power output of the second driver (e.g., by +3 dB) to a third power output, thereby creating a power output difference between the two drivers. The power output difference exceeds a predetermined power difference threshold (e.g., 8 dB) across at least a portion of the second frequency range, whereby the power output difference does not substantially change across at least the portion of the second frequency range. The processor also causes the first driver and the second driver to output a third frequency range above the second critical frequency Fc2 of the single audio channel with the same or similar power outputs. In some embodiments, the processor causes the first driver and the second driver to output the third frequency range with the same first power output associated with the first frequency range. That is, for the third frequency range above the second cutoff frequency Fc2, the third processing technique reverses the power output difference created in the second frequency range to output the audio sound with a same or similar power output.

The first critical frequency Fc1 is equivalent to the critical frequency Fc defined in the first and second processing techniques. In particular, the first critical frequency Fc1=343/(4*d), where distance d is the distance between the two drivers in meters (m). For example, distance d=0.15 m, then the critical frequency Fc=571.7 Hz. The second critical frequency is higher than the first critical frequency Fc1. The value of the second critical frequency Fc2 can be empirically derived through testing, for example, being set to a frequency where the spatial interference is found to be minimized when using the third processing technique. As another example, the value of the second critical frequency Fc2 can be determined psycho-acoustically as being approximately equal to a frequency where the interference dips caused by spatial interference/comb filtering are spaced so closely that the interference is not audible as such.

Advantageously, the spatial interference caused by the third processing technique is reduced in comparison to the spatial interference caused by conventional processing techniques, since the third processing technique causes the first driver to output the second frequency range with a significantly lower power output than the second driver outputting the second frequency range. By causing one of the drivers to output the second frequency range with a significantly lower power output, the third processing technique is able to reduce spatial interference caused by the two drivers. However, the third processing technique reduces the spatial interference to a lesser degree than the first and second processing techniques, since the third processing technique causes the power output of the first and second drivers in the third frequency range to be the same or similar, thereby causing more spatial interference than the first and second processing techniques, especially in the third frequency range. However, the third processing technique provides higher total power output from the two drivers than the first and second processing techniques.

Figure 13:
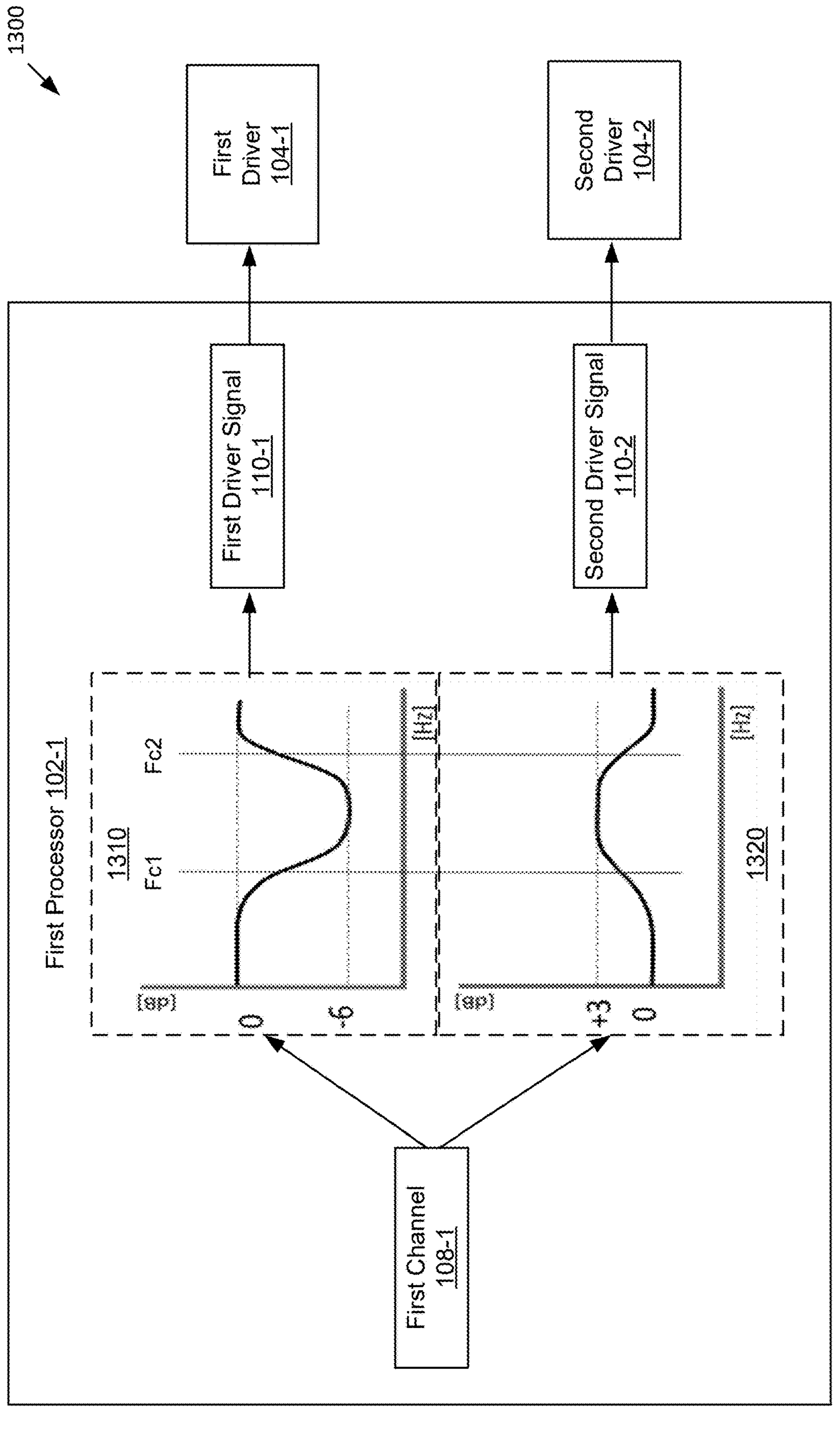
FIG. 13 illustrates a conceptual diagram of a third processing technique that can be implemented in the mono configuration system of FIG. 1, according to various embodiments.

FIG. 13 illustrates a conceptual diagram of a third processing technique 1300 that can be implemented in the mono configuration system 101 of FIG. 1, according to various embodiments. The third processing technique 1300 can be implemented, for example, by a processor 102 of FIG. 1. As shown, the third processing technique 1300 is executed by a first processor 102-1 of a first audio output device 100-1. In some embodiments, the third processing technique 1300 is also executed by a second processor 102-2 of a second audio output device 100-2.

As shown, the processor 102-1 receives a single audio channel 108-1 (from the audio source 114) and processes the single audio channel 108-1 to generate a first driver signal 110-1 for the first driver 104-1 and a second driver signal 110-2 for the second driver 104-2. The processor 102-1 performs a first filtering process 1310 to generate the first driver signal 110-1 and performs a second filtering process 1320 to generate the second driver signal 110-2. The first filtering process 1310 and the second filtering process 1320 can each be implemented using various audio filters (e.g., band-pass filters, shelf filters, or the like) or using digital signal processing techniques that digitally generate such audio filters.

In general, the first filtering process 1310 and the second filtering process 1320 each receive an input audio signal having a particular power input level and applies levels of gain to the input audio signal to generate a modified output audio signal having a modified power output level, the modified output audio signal comprising a driver signal. In particular, the first filtering process 1310 and the second filtering process 1320 each receive the same audio channel signal 108-1 having a particular power input level and applies different levels of gain (different amplification/de-amplification levels) to the second frequency range and the third frequency range of the same audio channel signal 108-1 to produce different driver signals 110-1, 110-2 having different power output levels for the second frequency range of the audio channel 108-1, but the same power output levels for the third frequency range of the audio channel 108-1.

As shown, the first filtering process 1310 passes through a first frequency range of the audio channel 108-1 below the first critical frequency Fc1 with no gain (0 dB) to produce a first power output for the first frequency range. Since no gain is applied, the first power output for the first frequency range will equal the power input level for the first frequency range of the input audio channel 108-1. The first filtering process 1310 also applies a negative gain (such as −6 dB) to a second frequency range of the audio channel 108-1 above the first critical frequency Fc1 and below a second critical frequency Fc2 to significantly reduce the power output for the second frequency range to a second power output. The second power output is kept the same or similar across at least the portion of the second frequency range. The second power output associated with the second frequency range in the first filtering process 1310 is significantly lower than a third power output associated with the second frequency range in the second filtering process 1310, as described below. The first filtering process 1310 also applies a positive gain (such as +6 dB relative to the second frequency range) to a third frequency range of the audio channel 108-1 above the second critical frequency Fc2 to significantly increase the power output for the third frequency range (relative to the second frequency range) to a fourth power output. The fourth power output is the same or similar to the first power output associated with the first frequency range.

As shown, the second filtering process 1320 also passes through the first frequency range of the audio channel 108-1 with no gain (0 dB) to produce a first power output for the first frequency range. The second filtering process 1320 also applies a positive gain (such as −3 dB) to the second frequency range of the audio channel 108-1 to significantly increase the power output for the second frequency range to a third power output. The third power output is kept the same or similar across at least the portion of the second frequency range. The second filtering process 1320 also applies a negative gain (such as −3 dB relative to the second frequency range) to the third frequency range of the audio channel 108-1 to significantly decrease the power output for the third frequency range (relative to the second frequency range) to the fourth power output, so that the fourth power output is the same or similar to the first power output associated with the first frequency range.

The resulting first driver signal 110-1 carries the second frequency range with the second power output that does not substantially change across at least the portion of the second frequency range. In addition, the resulting second driver signal 110-2 carries the second frequency range with the third power output that does not substantially change across at least the portion of the second frequency range. As such, the resulting first driver signal 110-1 and second driver signal 110-2 carries the second frequency range with a power output difference between the second and third power outputs of the two driver signals that exceeds a predetermined power difference threshold (e.g., 8 dB) across at least a portion of the second frequency range. As shown, the power output difference between the second and third power outputs does not substantially change across at least the portion of the second frequency range.

The first driver signal 110-1 and the second driver signal 110-2 causes the first driver 104-1 and the second driver 104-2, respectively, to each output the first frequency range of the audio channel 108-1 with a same first power output. The first driver signal 110-1 causes the first driver 104-1 to output the second frequency range at a second power output. The second driver signal 110-2 causes the second driver 104-2 to output the second frequency range at a third power output that is higher than the second power output and the first power output. The first driver 104-1 and the second driver 104-2 outputs the second frequency range with a power output difference between the second and third power outputs that exceeds a power difference threshold (e.g., 8 dB). As shown, the filtering processes 1310, 1320 and drivers 104-1, 104-2 can exhibit a transitional frequency range in which, as the frequency increases, a power output of the first driver 104-1 decreases and the power output of the second driver 104-2 increases. The first driver signal 110-1 and the second driver signal 110-2 causes the first driver 104-1 and the second driver 104-2, respectively, to each output the third frequency range of the audio channel 108-1 with a same fourth power output that is equivalent to the first power output associated with the first frequency range.

Figure 14:
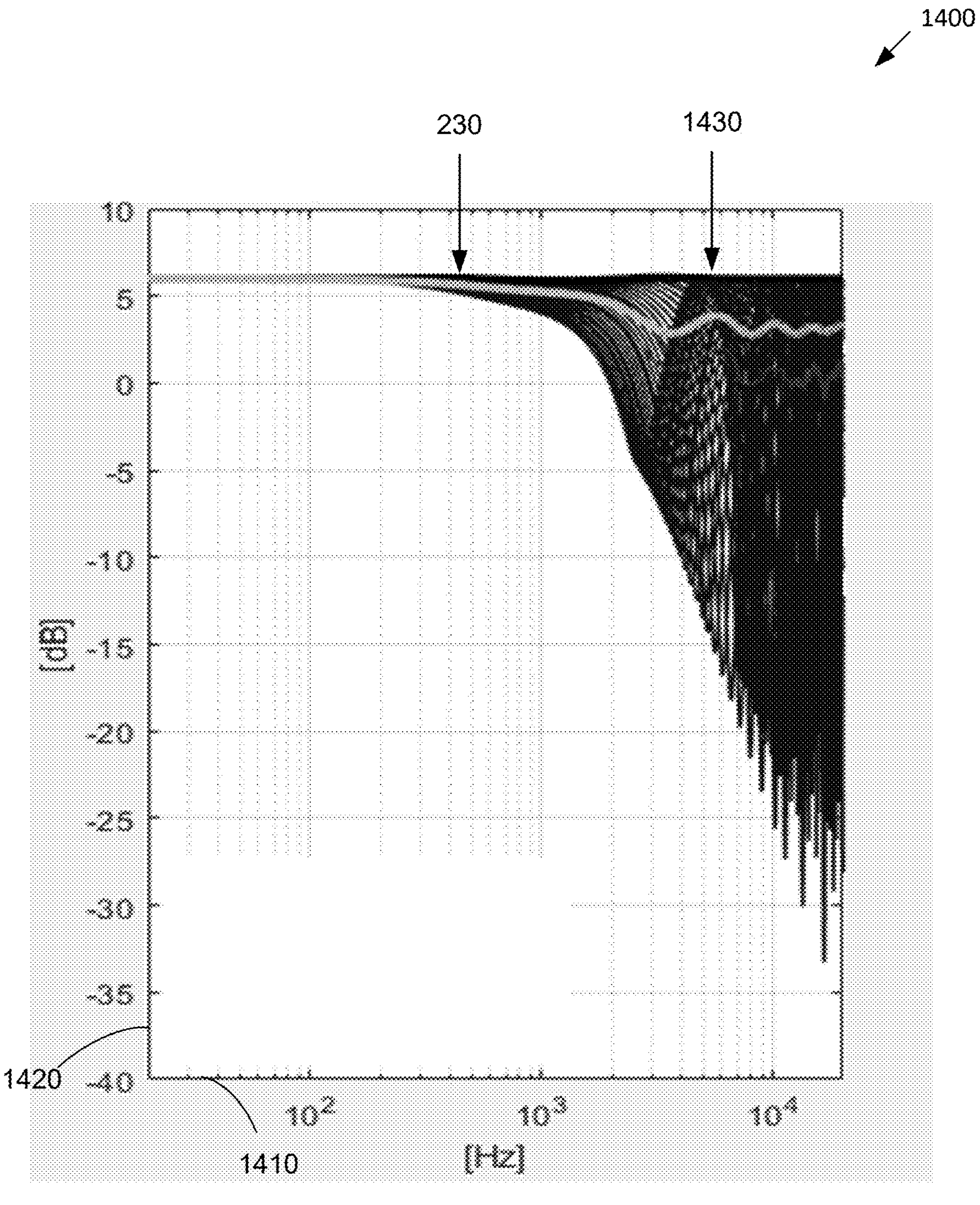
FIG. 14 is a frequency response graph that illustrates interference caused by implementing a third processing technique in the mono configuration system of FIG. 1, according to various embodiments.

FIG. 14 is a frequency response graph 1400 that illustrates interference caused by implementing a third processing technique 1300 in the mono configuration system 101 of FIG. 1, according to various embodiments. The frequency response graph 1400 comprises a frequency (Hz) axis 1410 and a gain level (dB) axis 1420 that illustrates spatial interference caused by the third processing technique 1300. In comparison to the frequency response graph 200 of FIG. 2 that illustrates spatial interference caused by conventional signal processing techniques, it is evident that the spatial interference caused by the third processing technique 1300 is reduced. The reduction of spatial interference shown in the frequency response graph 1400 of FIG. 14 in the second frequency range above the first critical frequency Fc1 230 and below the second critical frequency Fc2 1430 is particularly evident in comparison to the frequency response graph 200 of FIG. 2. The reduced spatial interference caused by the third processing technique 1300 improves the quality of the audio sound that is output by the plurality of drivers 104-1, 104-2 of the audio output device 100-1 relative to conventional signal processing techniques.

Figure 15:
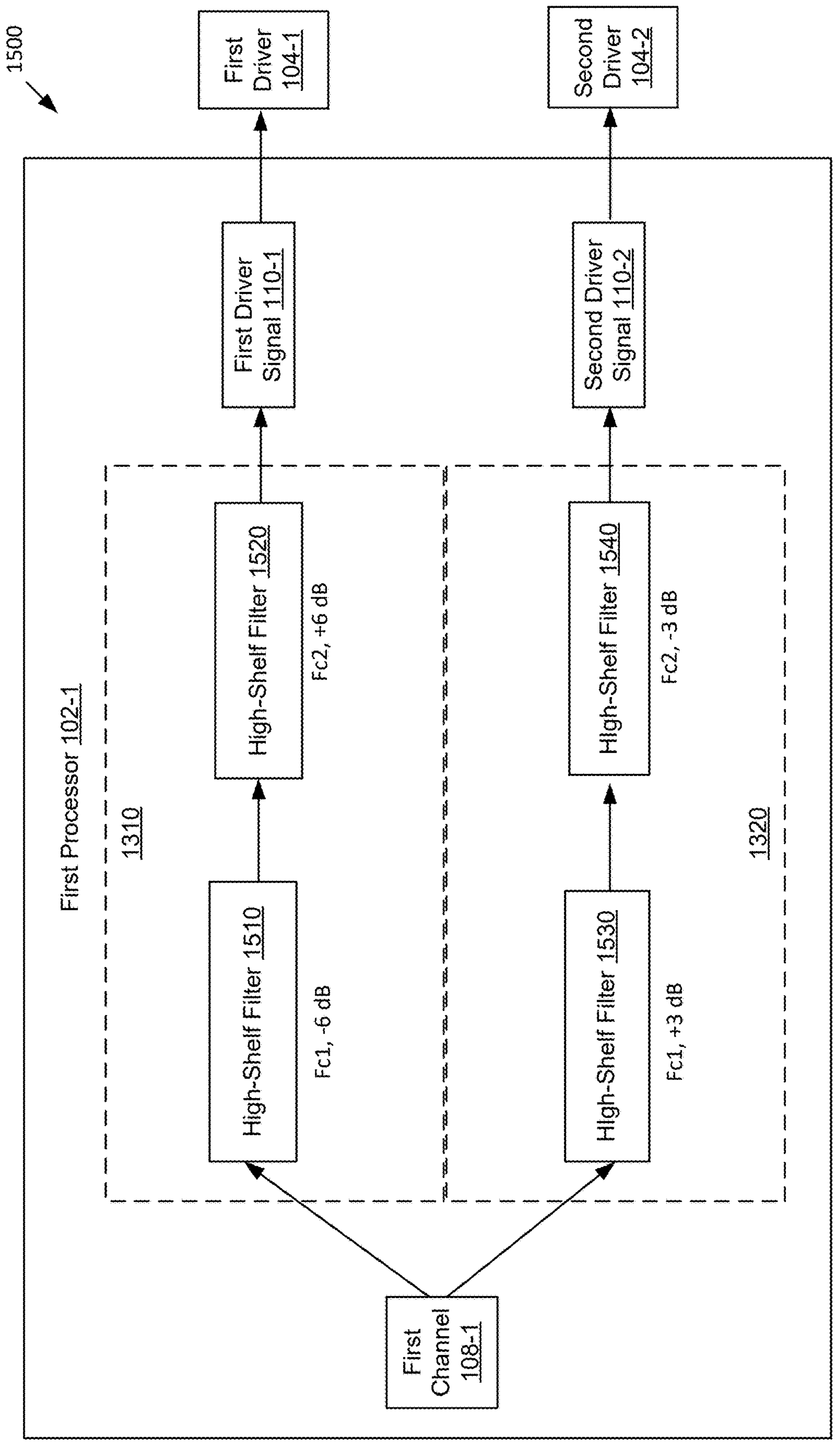
FIG. 15 illustrates a conceptual diagram of a first implementation of the third processing technique of FIG. 13, according to various embodiments.

FIG. 15 illustrates a conceptual diagram of a first implementation 1500 of the third processing technique 1300 of FIG. 13, according to various embodiments. The first implementation 1500 can be implemented, for example, by a processor 102 of FIG. 1, such as the first processor 102-1 of the first audio output device 100-1, the second processor 102-2 of the second audio output device 100-2 and/or the processor of the audio source 114 (for legacy audio output devices).

As shown, the processor 102-1 receives and processes a single audio channel 108-1 to generate a first driver signal 110-1 for the first driver 104-1. The processor 102-1 performs a first filtering process 1310 to generate the first driver signal 110-1 by applying a first high-shelf filter 1510 to the audio channel 108-1 with a selected cutoff frequency equal to the first critical frequency Fc1 and a selected gain (such as −6 dB). A second high-shelf filter 1520 is then applied to the output of the first high-shelf filter 1510 with a selected cutoff frequency equal to the second critical frequency Fc2 and a selected gain (such as +6 dB). The output of the second high-shelf filter 1520 comprises the first driver signal 110-1. As such, the first high-shelf filter 1510 and the second high-shelf filter 1520 operate in conjunction to pass through a first frequency range below the first critical frequency Fc1, decrease the power output (such as −6 dB) of a second frequency range above the first critical frequency Fc1 and below the second critical frequency Fc2, and increase the power output (such as +6 dB relative to the second frequency range) of a third frequency range above the second critical frequency Fc2. The resulting first driver signal 110-1 carries the first frequency range at a first power output, the second frequency range at a lower second power output (such as by −6 dB), and the third frequency range at a fourth power output that is equivalent to the first power output. In this manner, the first driver 104-1 outputs the first frequency range with the first power output, the second frequency range with the second power output, and the third frequency range with the fourth/first power output.

As shown, the processor 102-1 processes a single audio channel 108-1 to generate a second driver signal 110-2 for the second driver 104-2. The processor 102-1 performs a second filtering process 1320 to generate the second driver signal 110-2 by applying a third high-shelf filter 1530 to the audio channel 108-1 with a selected cutoff frequency equal to the first critical frequency Fc1 and a selected gain (such as +3 dB). A fourth high-shelf filter 1540 is then applied to the output of the third high-shelf filter 1530 with a selected cutoff frequency equal to the second critical frequency Fc2 and a selected gain (such as −3 dB). The output of the fourth high-shelf filter 1540 comprises the second driver signal 110-2. As such, the third high-shelf filter 1530 and the fourth high-shelf filter 1540 operate in conjunction to pass through a first frequency range below the first critical frequency Fc1, increase the power output (such as by +3 dB) of a second frequency range above the first critical frequency Fc1 and below the second critical frequency Fc2, and decrease the power output (such as by −3 dB) of a third frequency range above the second critical frequency Fc2. The resulting second driver signal 110-2 carries the first frequency range at a first power output, the second frequency range at a higher third power output (such as by +3 dB), and the third frequency range at a fourth power output that is equivalent to the first power output. In this manner, the second driver 104-2 outputs the first frequency range with the first power output, the second frequency range with the third power output, and the third frequency range with the fourth/first power output. In various embodiments, the power output difference between the two drivers exceeds a predetermined power difference threshold (e.g., 8 dB) across at least a portion of the second frequency range, whereby the power output difference does not substantially increase or decrease across at least the portion of the second frequency range.

Figure 16:
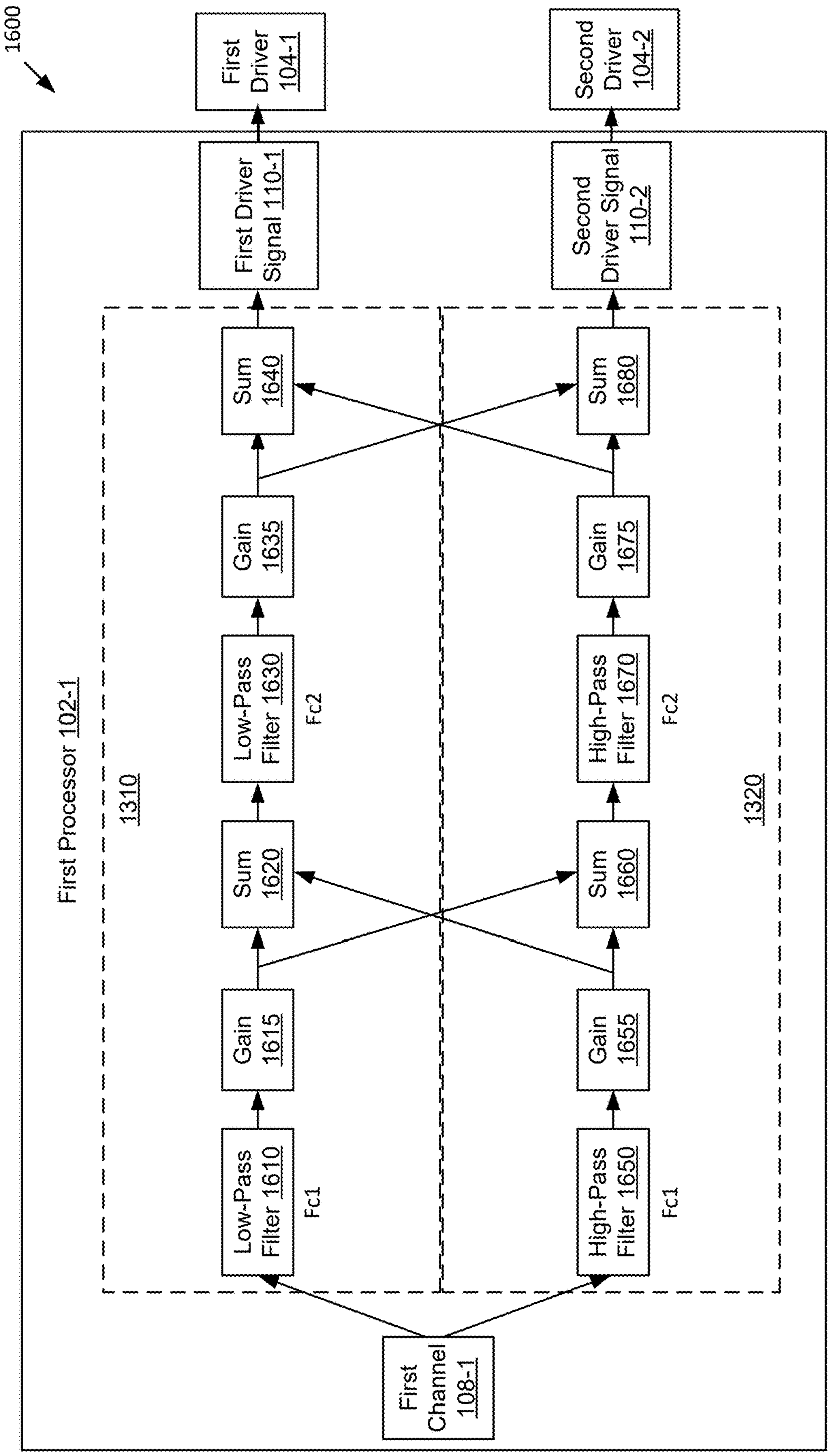
FIG. 16 illustrates a conceptual diagram of a second implementation of the third processing technique of FIG. 13, according to various embodiments.

FIG. 16 illustrates a conceptual diagram of a second implementation 1600 of the third processing technique 1300 of FIG. 13, according to various embodiments. The second implementation 1600 can be implemented, for example, by a processor 102 of FIG. 1, such as the first processor 102-1 of the first audio output device 100-1, the second processor 102-2 of the second audio output device 100-2 and/or the processor of the audio source 114 (for legacy audio output devices). The second implementation 1600 includes a first low-pass filter 1610, a first gain component 1615, a first summing component 1620, a second low-pass filter 1630, a second gain component 1635, a second summing component 1640, a first high-pass filter 1650, a third gain component 1655, a third summing component 1660, a second high-pass filter 1670, a fourth gain component 1675, and a fourth summing component 1680.

As shown, the processor 102-1 processes a single audio channel 108-1 to generate a first driver signal 110-1 for the first driver 104-1. The processor 102-1 performs a first filtering process 1310 to generate the first driver signal 110-1 by applying the first low-pass filter 1610 to the audio channel 108-1 with a selected cutoff frequency equal to the first critical frequency Fc1. The first gain component 1615 is applied to the output of the first low-pass filter 1610 with a selected gain. The first summing component 1620 then receives and sums the output of the first gain component 1615 and the output of the third gain component 1655. The second low-pass filter 1630 is then applied to the output of the first summing component 1620 with a selected cutoff frequency equal to the second critical frequency Fc2. The second gain component 1635 is applied to the output of the second low-pass filter 1630 with a selected gain. The second summing component 1640 then receives and sums the output of the second gain component 1635 and the output of the fourth gain component 1675. The output of the second summing component 1640 comprises the first driver signal 110-1.

As shown, the processor 102-1 also processes the single audio channel 108-1 to generate a second driver signal 110-2 for the second driver 104-2. The processor 102-1 performs a second filtering process 1320 to generate the second driver signal 110-2 by applying the first high-pass filter 1650 to the audio channel 108-1 with a selected cutoff frequency equal to the first critical frequency Fc1. The third gain component 1655 is applied to the output of the first high-pass filter 1650 with a selected gain. The third summing component 1660 then receives and sums the output of the first gain component 1615 and the output of the third gain component 1655. The second high-pass filter 1670 is then applied to the output of the third summing component 1660 with a selected cutoff frequency equal to the second critical frequency Fc2. The fourth gain component 1675 is applied to the output of the second high-pass filter 1670 with a selected gain. The fourth summing component 1680 then receives and sums the output of the second gain component 1635 and the output of the fourth gain component 1675. The output of the fourth summing component 1680 comprises the second driver signal 110-2.

Figure 17:
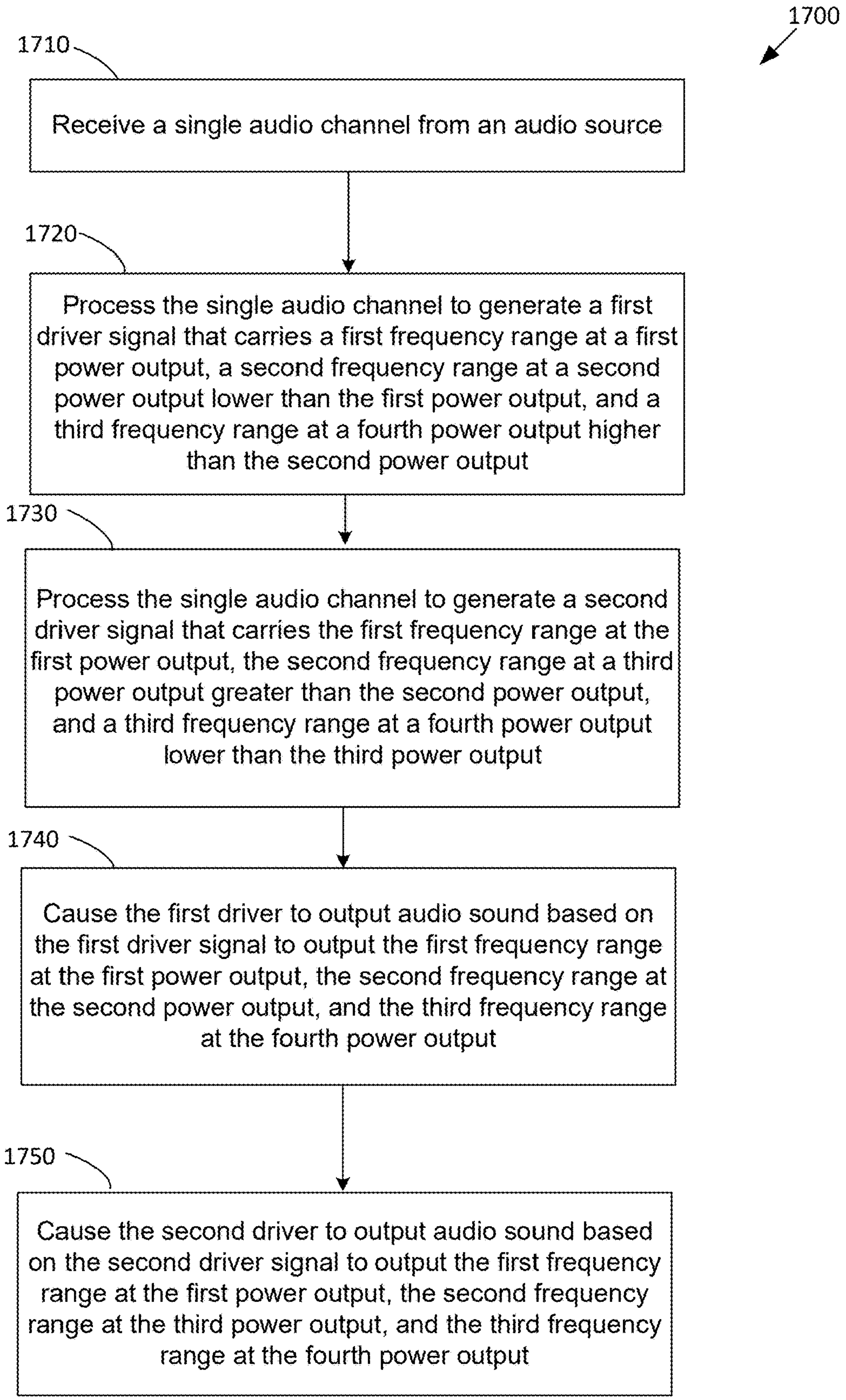
FIG. 17 is a flow diagram of method steps for the third processing technique of FIG. 13, according to various embodiments.

FIG. 17 is a flow diagram of method steps for the third processing technique 1300 of FIG. 13, according to various embodiments. Although the method steps are described in conjunction with the systems of FIGS. 1-6, 8-11, and 13-16, persons skilled in the art will understand that any system configured to perform the method steps, in any order, falls within the scope of the various embodiments. A method 1700 for the third processing technique can be implemented, for example, by a processor 102 of FIG. 1, such as the first processor 102-1 of the first audio output device 100-1, the second processor 102-2 of the second audio output device 100-2, or the processor of audio source 114 (for legacy audio output devices). In some embodiments, the method 1700 for the third processing technique 1300 is implemented by the processor 102 to generate a first driver signal 110-1 for a first driver 104-1 and a second driver signal 110-2 for a second driver 104-2, wherein the first driver 104-1 and the second driver 104-2 physically reside within a housing of a same audio output device 100-1.

As shown, the method 1700 begins at step 1710, where the processor 102 receives an audio signal 106 from an audio source 114, the audio signal 106 comprising a single audio channel (such as a first audio channel 108-1). The processor 102 then processes (at step 1720) the single audio channel 108-1 to generate a first driver signal 110-1 that carries a first frequency range (e.g., a low frequency range) below a first critical frequency Fc1 at a first power output, a second frequency range above the first critical frequency Fc1 and below the second critical frequency Fc2 at a second power output, and a third frequency range above the second critical frequency Fc2 at a fourth power output that is the same or similar to the first power output. The second power output is significantly lower than the first/fourth power output and does not substantially change across at least the portion of the second frequency range.

The processor 102 then processes (at step 1730) the single audio channel 108-1 to generate the second driver signal 110-2 so that the second driver signal 110-2 carries the first frequency range at the first power output, the second frequency range at a third power output, and the third frequency range at the fourth power output that is the same or similar to the first power output. The third power output is significantly greater than the second power output (such as +8 dB or more). The resulting first driver signal 110-1 and second driver signal 110-2 carries the second frequency range with a power output difference between the two driver signals that exceeds a predetermined power difference threshold (e.g., 8 dB or more) across at least a portion of the second frequency range, wherein the power output difference does not substantially change across at least the portion of the second frequency range.

The processor 102 causes (at step 1740) the first driver 104-1 to output audio sound based on the first driver signal 110-1, whereby the first driver 104-1 outputs the first frequency range at the first power output, outputs the second frequency range at the second power output, and outputs the third frequency range at the first/fourth power output. The processor 102 also causes (at step 1750) the second driver 104-2 to output audio sound based on the second driver signal 110-2, whereby the second driver 104-2 outputs the first frequency range at the first power output, outputs the second frequency range at the third power output, and outputs the third frequency range at the first/fourth power output. The first driver 104-1 and the second driver 104-2 outputs the second frequency range with a power output difference between the two driver signals that exceeds a power difference threshold (e.g., 8 dB or more) across at least a portion of the second frequency range, whereby the power output difference does not substantially change across at least the portion of the second frequency range.

By implementing the method 1700 of the third processing technique, the processor 102 causes the first driver and the second driver of a same audio output device to output a first frequency range (e.g., below a first critical frequency Fc1) of a single audio channel with a same or similar first power output, output a second frequency range (e.g., above the first critical frequency Fc1 and below the second critical frequency Fc2) of the single audio channel with different power outputs, and output a third frequency range (e.g., above the second critical frequency Fc2) of a single audio channel with a same or similar first/fourth power output. In these embodiments, the processor causes the first driver to output the second frequency range with a second power output and causes the second driver to output the second frequency range with a third power output that is significantly greater than the second power output. Advantageously, the third processing technique reduces the spatial interference caused by conventional signal processing techniques by causing one driver of a plurality of drivers of a same audio output device to output the second frequency range with substantial power output, while causing the other driver to output the high frequency range with a significantly lower power output, which reduces spatial interference especially within the second frequency range. In addition, the power output of the second driver for the second frequency range can also be significantly increased to compensate for the lack of power output by the second driver for the second frequency range and to increase the total power output of the two drivers.

In sum, techniques for outputting audio sound in a mono configuration system that includes an audio source and at least one audio output device. The audio source is configured to generate and transmit multiple audio channels to multiple audio output devices. Each audio output device includes a plurality of drivers (including a first driver and a second driver) and a processor for executing mono-signal processing techniques including a first processing technique, a second processing technique, and a third processing technique. Each of the mono-signal processing techniques reduces spatial interference typically caused by conventional signal processing techniques when the plurality of drivers of the same audio output device output a same audio channel. In operation, the audio source transmits a single audio channel to an audio output device, which processes the single audio channel to generate a first driver signal for the first driver and a second driver signal for the second driver.

In the first processing technique, the first driver signal causes the first driver to output a first frequency range below a first critical frequency Fc1 at a first power output and output a second frequency range above the first critical frequency Fc1 at a second power output equal to no power output or a minimal/nominal power output level. In the first processing technique, the second driver signal causes the second driver to output the first frequency range at the first power output and output the second frequency range at a third power output that is significantly greater than the first power output and the second power output.

In the second processing technique, the first driver signal causes the first driver to output a first frequency range below a first critical frequency Fc1 at a first power output and output a second frequency range above a first critical frequency Fc1 at a second power output that is significantly lower than the first power output but greater than a minimal/nominal power output level. In the second processing technique, the second driver signal causes the second driver to output the first frequency range at the first power output and output the second frequency range at a third power output that is significantly greater than the first power output and the second power output.

In the third processing technique, the first driver signal causes the first driver to output a first frequency range below a first critical frequency Fc1 at a first power output, output a second frequency range above a first critical frequency Fc1 and below a second critical frequency Fc2 at a second power output that is significantly lower than the first power output but not equal to no power output, and output a third frequency range above the second critical frequency Fc2 at a fourth power output that is equal to the first power output. In the third processing technique, the second driver signal causes the second driver to output the first frequency range at the first power output, output the second frequency range at a third power output that is significantly greater than the first power output and the second power output, and output the third frequency range at the fourth power output that is equal to the first power output.

At least one technical advantage of the disclosed techniques relative to the prior art is that, with the disclosed techniques, the interference caused by the combined audio sound output of a plurality of drivers of a same audio output device outputting a same audio channel is significantly reduced. As a result, the quality of the audio sound output is improved when using a plurality of drivers of a same audio output device to output an audio signal for a single audio channel. Reducing an audio sound output of the second frequency range (e.g., a high frequency range) of the single audio channel can reduce the perceived variance in volume and/or air pressure between a listener's left ear or right ear and/or the perceived change in volume as the listener moves his or her head. This additionally produces a frequency response that is more consistent across the frequency spectrum and across the spatial field, as well as being more consistent the source audio channel signal. Also, outputting the first frequency range (e.g., a low frequency range) of the single audio channel through each of the plurality of drivers can increase the power efficiency of the audio sound output as compared with completely disabling one or more drivers for the full frequency range of the single audio channel. These technical advantages provide one or more technological improvements over prior art approaches.

Aspects of the subject matter described herein are set out in the following numbered clauses.

1. In some embodiments, a method, comprising: receiving a first audio channel signal; causing a first driver and a second driver of an audio output device to output a first frequency range of the first audio channel signal with a first power output; causing the first driver to output a second frequency range of the first audio channel signal with a second power output; and causing the second driver to output the second frequency range of the first audio channel signal with a third power output that is higher than the second power output, wherein the second frequency range is higher than the first frequency range.

2. The method of clause 1, wherein the first audio channel signal comprises one channel of a multi-channel signal generated by an audio source device coupled to the audio output device.

3. The method of any of clauses 1-2, wherein the first driver and the second driver reside within a housing of the audio output device.

4. The method of any of clauses 1-3, further comprising: generating a first driver signal for the first driver via a processor; and generating a second driver signal for the second driver via the processor, wherein the processor resides in the audio output device.

5. The method of any of clauses 1-4, further comprising: generating a first driver signal for the first driver via a processor; and generating a second driver signal for the second driver via the processor, wherein the processor resides in an audio source device coupled to the audio output device.

6. The method of any of clauses 1-5, wherein: the first frequency range is below a first critical frequency Fc1; the second frequency range is above the first critical frequency Fc1; and the first critical frequency Fc1 is determined based on a distance between the first driver and the second driver.

7. The method of any of clauses 1-6, wherein: the second power output is substantially equal to no power output, and the first driver does not output the second frequency range; and the third power output is higher than the first power output.

8. The method of any of clauses 1-7, wherein: the second power output is lower than the first power output; and the third power output is higher than the first power output.

9. The method of any of clauses 1-8, wherein a power difference between the second power output and the third power output is greater than a power difference threshold.

10. The method of any of clauses 1-9, wherein the power difference between the second power output and the third power output is consistent across at least a portion of the second frequency range.

11. The method of any of clauses 1-10, further comprising causing the first driver and the second driver to output a third frequency range of the first audio channel signal with a fourth power output, wherein the third frequency range is higher than the second frequency range.

12. The method of any of clauses 1-11, wherein the fourth power output is equal to the first power output.

13. In some embodiments, one or more non-transitory computer-readable media storing instructions that, when executed by one or more processors, cause the one or more processors to perform the steps of: receiving a first audio channel signal; causing a first driver and a second driver of an audio output device to output a first frequency range of the first audio channel signal with a first power output; causing the first driver to output a second frequency range of the first audio channel signal with a second power output; and causing the second driver to output the second frequency range of the first audio channel signal with a third power output that is higher than the second power output, wherein the second frequency range is higher than the first frequency range.

14. The one or more non-transitory computer-readable media of clause 13, wherein the first audio channel signal comprises one channel of a multi-channel signal generated by an audio source device coupled to the audio output device.

15. The one or more non-transitory computer-readable media of any of clauses 13-14, wherein: the first frequency range is below a first critical frequency Fc1; the second frequency range is above the first critical frequency Fc1; and the first critical frequency Fc1 is determined based on a distance between the first driver and the second driver.

16. The one or more non-transitory computer-readable media of any of clauses 13-15, wherein: the second power output is substantially equal to no power output, and the first driver does not output the second frequency range; and third power output is higher than the first power output.

17. The one or more non-transitory computer-readable media of any of clauses 13-16, wherein: the second power output is lower than the first power output; and third power output is higher than the first power output.

18. The one or more non-transitory computer-readable media of any of clauses 13-17, further comprising causing the first driver and the second driver to output a third frequency range of the first audio channel signal with a fourth power output, wherein the third frequency range is higher than the second frequency range.

19. The one or more non-transitory computer-readable media of any of clauses 13-18, wherein the fourth power output is equal to the first power output.

20. In some embodiments, an audio device, comprising: a memory storing instructions; and a processor coupled to the memory that executes the instructions to perform the steps of: receiving a first audio channel signal; causing a first driver and a second driver of an audio output device to output a first frequency range of the first audio channel signal with a first power output; causing the first driver to output a second frequency range of the first audio channel signal with a second power output; and causing the second driver to output the second frequency range of the first audio channel signal with a third power output that is higher than the second power output, wherein the second frequency range is higher than the first frequency range.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a “module,” a “system,” or a “computer.” In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:

receiving a first audio channel signal;

causing a first driver and a second driver of an audio output device to output a first frequency range of the first audio channel signal with a first power output;

causing the first driver to output a second frequency range of the first audio channel signal with a second power output; and causing the second driver to output the second frequency range of the first audio channel signal with a third power output that is higher than the second power output, wherein the second frequency range is higher than the first frequency range.

2. The method of claim 1, wherein the first audio channel signal comprises one channel of a multi-channel signal generated by an audio source device coupled to the audio output device.

3. The method of claim 1, wherein the first driver and the second driver reside within a housing of the audio output device.

4. The method of claim 3, further comprising:

generating a first driver signal for the first driver via a processor; and generating a second driver signal for the second driver via the processor, wherein the processor resides in the audio output device.

5. The method of claim 3, further comprising:

generating a first driver signal for the first driver via a processor; and generating a second driver signal for the second driver via the processor, wherein the processor resides in an audio source device coupled to the audio output device.

6. The method of claim 1, wherein:

the first frequency range is below a first critical frequency Fc1;

the second frequency range is above the first critical frequency Fc1; and the first critical frequency Fc1 is determined based on a distance between the first driver and the second driver.

7. The method of claim 1, wherein:

the second power output is substantially equal to no power output, and the first driver does not output the second frequency range; and the third power output is higher than the first power output.

8. The method of claim 1, wherein:

the second power output is lower than the first power output; and the third power output is higher than the first power output.

9. The method of claim 1, wherein a power difference between the second power output and the third power output is greater than a power difference threshold.

10. The method of claim 9, wherein the power difference between the second power output and the third power output is consistent across at least a portion of the second frequency range.

11. The method of claim 1, further comprising causing the first driver and the second driver to output a third frequency range of the first audio channel signal with a fourth power output, wherein the third frequency range is higher than the second frequency range.

12. The method of claim 11, wherein the fourth power output is equal to the first power output.

13. One or more non-transitory computer-readable media storing instructions that, when executed by one or more processors, cause the one or more processors to perform the steps of:

receiving a first audio channel signal;

causing a first driver and a second driver of an audio output device to output a first frequency range of the first audio channel signal with a first power output;

causing the first driver to output a second frequency range of the first audio channel signal with a second power output; and causing the second driver to output the second frequency range of the first audio channel signal with a third power output that is higher than the second power output, wherein the second frequency range is higher than the first frequency range.

14. The one or more non-transitory computer-readable media of claim 13, wherein the first audio channel signal comprises one channel of a multi-channel signal generated by an audio source device coupled to the audio output device.

15. The one or more non-transitory computer-readable media of claim 13, wherein:

the first frequency range is below a first critical frequency Fc1;

the second frequency range is above the first critical frequency Fc1; and the first critical frequency Fc1 is determined based on a distance between the first driver and the second driver.

16. The one or more non-transitory computer-readable media of claim 13, wherein:

the second power output is substantially equal to no power output, and the first driver does not output the second frequency range; and third power output is higher than the first power output.

17. The one or more non-transitory computer-readable media of claim 13, wherein:

the second power output is lower than the first power output; and third power output is higher than the first power output.

18. The one or more non-transitory computer-readable media of claim 13, further comprising causing the first driver and the second driver to output a third frequency range of the first audio channel signal with a fourth power output, wherein the third frequency range is higher than the second frequency range.

19. The one or more non-transitory computer-readable media of claim 13, wherein the fourth power output is equal to the first power output.

20. An audio device, comprising:

a memory storing instructions; and a processor coupled to the memory that executes the instructions to perform the steps of:

receiving a first audio channel signal;

causing a first driver and a second driver of an audio output device to output a first frequency range of the first audio channel signal with a first power output;

causing the first driver to output a second frequency range of the first audio channel signal with a second power output; and causing the second driver to output the second frequency range of the first audio channel signal with a third power output that is higher than the second power output, wherein the second frequency range is higher than the first frequency range.

* * * * *